(12) United States Patent
Haim et al.

(10) Patent No.: US 8,799,330 B2
(45) Date of Patent: Aug. 5, 2014

(54) DETERMINING THE VALUE OF AN ASSOCIATION BETWEEN ONTOLOGIES

(71) Applicant: International Business Machines Corporation, Armonk, NY (US)

(72) Inventors: Patrick Haim, Pietrebais (BE); Freddy Lorge, Vedrin (BE); Matthew A. Pantland, Johannesburg (ZA); Tom O. Rojahn, Oslo (NO); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/957,550

(22) Filed: Aug. 2, 2013

(65) Prior Publication Data
US 2014/0052759 A1    Feb. 20, 2014

Related U.S. Application Data

(63) Continuation of application No. 13/589,614, filed on Aug. 20, 2012, now Pat. No. 8,539,001.

(51) Int. Cl.
  *G06F 7/00* (2006.01)
  *G06F 17/30* (2006.01)
(52) U.S. Cl.
  USPC ......................................................... 707/803
(58) Field of Classification Search
  USPC ......................................................... 707/803
  See application file for complete search history.

(56) References Cited

U.S. PATENT DOCUMENTS

| | | | |
|---|---|---|---|
| 6,092,099 | A | 7/2000 | Irie et al. |
| 6,167,370 | A | 12/2000 | Tsourikov et al. |
| 6,487,545 | B1 | 11/2002 | Wical |
| 7,027,974 | B1 | 4/2006 | Busch et al. |
| 7,228,302 | B2 | 6/2007 | Kuchinsky et al. |
| 7,284,196 | B2 | 10/2007 | Skeen et al. |
| 7,308,458 | B2 | 12/2007 | Vincent, III |

(Continued)

FOREIGN PATENT DOCUMENTS

| | | |
|---|---|---|
| EP | 1596313 | 12/2011 |
| WO | 0115042 | 3/2001 |

(Continued)

OTHER PUBLICATIONS

Shvaiko et al.; A Survey of Schema-based Matching Approaches; Journal on Data Semantics IV; vol. 3730; 2005; 26 pages.

(Continued)

*Primary Examiner* — Charles Lu
(74) *Attorney, Agent, or Firm* — Schmeiser, Olsen & Watts; John Pivnichny

(57) ABSTRACT

An approach is presented for determining a value of an association between first and second ontologies, S1 and S2. A first bridge of S1 with S2 is generated. A schema S' is created from sub-schema S extracted from the first bridge by removing common concepts and relationships to the common concepts, and for each common concept to which first and second concepts have immediate links in S, by creating a new immediate link in S' between the first and second concepts. Based on an intrinsic value of S' and a strength of the bridge of S1 with S, a value of the first bridge is determined. Similarly, a value of a second bridge of S2 with S1 is determined. A value of the association between S1 and S2 is determined based on a sum of the values of the first and second bridges.

7 Claims, 18 Drawing Sheets

(56) References Cited

U.S. PATENT DOCUMENTS

| | | | |
|---|---|---|---|
| 7,401,087 | B2 | 7/2008 | Copperman |
| 7,433,876 | B2 | 10/2008 | Spivack et al. |
| 7,493,333 | B2 | 2/2009 | Hill et al. |
| 7,496,593 | B2 | 2/2009 | Gardner et al. |
| 7,558,791 | B2 | 7/2009 | Wahl |
| 7,743,078 | B2 | 6/2010 | Azvine et al. |
| 7,890,518 | B2 | 2/2011 | Aasman |
| 7,912,701 | B1 | 3/2011 | Gray et al. |
| 7,966,305 | B2 | 6/2011 | Olsen |
| 8,041,746 | B2 | 10/2011 | Stubec |
| 8,060,519 | B2 | 11/2011 | Hosokawa |
| 8,078,647 | B2 | 12/2011 | Liang et al. |
| 8,219,540 | B2 | 7/2012 | Carter et al. |
| 8,352,403 | B2 | 1/2013 | Lee et al. |
| 8,478,766 | B1 | 7/2013 | Tsypliaev et al. |
| 8,528,018 | B2 | 9/2013 | Patil et al. |
| 8,539,001 | B1 | 9/2013 | Haim et al. |
| 8,747,115 | B2 | 6/2014 | Lorge et al. |
| 2003/0018616 | A1 | 1/2003 | Wilbanks et al. |
| 2003/0074516 | A1 | 4/2003 | Cho et al. |
| 2004/0010491 | A1 | 1/2004 | Riedinger |
| 2004/0093331 | A1 | 5/2004 | Garner et al. |
| 2005/0027681 | A1 | 2/2005 | Bernstein et al. |
| 2005/0131920 | A1 | 6/2005 | Rust et al. |
| 2005/0154723 | A1 | 7/2005 | Liang |
| 2005/0228981 | A1 | 10/2005 | Gavrilov et al. |
| 2006/0031757 | A9 | 2/2006 | Vincent, III |
| 2006/0053098 | A1 | 3/2006 | Gardner et al. |
| 2006/0053099 | A1 | 3/2006 | Gardner et al. |
| 2006/0053151 | A1 | 3/2006 | Gardner et al. |
| 2006/0053171 | A1 | 3/2006 | Eldridge et al. |
| 2006/0053172 | A1 | 3/2006 | Gardner et al. |
| 2006/0053174 | A1 | 3/2006 | Gardner et al. |
| 2006/0053175 | A1 | 3/2006 | Gardner et al. |
| 2006/0074832 | A1 | 4/2006 | Gardner et al. |
| 2006/0074980 | A1 | 4/2006 | Sarkar |
| 2007/0016563 | A1 | 1/2007 | Omoigui |
| 2007/0179971 | A1 | 8/2007 | Benson |
| 2007/0226203 | A1 | 9/2007 | Adya et al. |
| 2008/0016036 | A1 | 1/2008 | Omoigui |
| 2008/0021912 | A1 | 1/2008 | Seligman et al. |
| 2008/0040308 | A1 | 2/2008 | Ranganathan et al. |
| 2008/0091634 | A1 | 4/2008 | Seeman |
| 2008/0091727 | A1 | 4/2008 | Wynett et al. |
| 2008/0162498 | A1 | 7/2008 | Omoigui |
| 2008/0189269 | A1 | 8/2008 | Olsen |
| 2008/0195570 | A1 | 8/2008 | Alsafadi et al. |
| 2008/0288456 | A1 | 11/2008 | Omoigui |
| 2008/0294644 | A1 | 11/2008 | Liu et al. |
| 2008/0313229 | A1 | 12/2008 | Taswell |
| 2009/0048907 | A1 | 2/2009 | Lieberman |
| 2009/0077094 | A1 | 3/2009 | Bodain |
| 2009/0112903 | A1 | 4/2009 | Liang et al. |
| 2009/0254572 | A1 | 10/2009 | Redlich et al. |
| 2010/0036788 | A1 | 2/2010 | Wu et al. |
| 2010/0115436 | A1 | 5/2010 | Embley et al. |
| 2010/0121885 | A1 | 5/2010 | Hosomi et al. |
| 2010/0131516 | A1 | 5/2010 | Jean-Mary |
| 2010/0217784 | A1 | 8/2010 | Carter et al. |
| 2011/0040717 | A1 | 2/2011 | Rho et al. |
| 2011/0093467 | A1 | 4/2011 | Sharp et al. |
| 2011/0113095 | A1 | 5/2011 | Hatami-Hanza |
| 2011/0153539 | A1 | 6/2011 | Rojahn et al. |
| 2011/0238610 | A1 | 9/2011 | Lee et al. |
| 2012/0173493 | A1 | 7/2012 | Sabbouh |
| 2012/0239677 | A1 | 9/2012 | Neale |
| 2013/0091119 | A1 | 4/2013 | Huang et al. |
| 2013/0166303 | A1 | 6/2013 | Chang et al. |
| 2013/0260358 | A1 | 10/2013 | Lorge et al. |

FOREIGN PATENT DOCUMENTS

| | | |
|---|---|---|
| WO | 0221259 | 3/2002 |
| WO | 0235376 | 5/2002 |
| WO | 03042872 | 5/2003 |

OTHER PUBLICATIONS

Euzenat et al.; An integrative proximity measure for ontology alignment; Proceedings of the Semantic Integration workshop at the International Semantic Web Conference (ISWC); 2003; 6 pages.

Hu et al.; Discovering Simple Mappings Between Relational Database Schemas and Ontologies; In Proceedings of ISWC/ASWC2007; 2007; 14 pages.

Raghavan et al.; Schema Mapper: A Visualization Tool for DL Integration; JCDL '05; Jun. 7-11, 2005; p. 414.

Mir et al.; An Unsupervised Approach for Acquiring Ontologies and RDF Data from Online Life Science Databases; Lecture Notes in Computer Science; vol. 6089; Springer-Verlag Berlin Heidelberg 2010; The Semantic Web: Research and Applications, 7th Extended Semantic Web Conference; ESWC 2010; Heraklion, Crete, Greece, May 30-Jun. 3, 2010; Proceedings, Part II; 15 pages.

Hayes et al.; A Collaborative Development Environment for Ontologies (CODE); Semantic Integration Workshop (ISWC); Oct. 2003; 5 pages.

Balakrishna et al.; Automatic Ontology Creation from Text for National Intelligence Priorities Framework (NIPF); Proceedings of 3rd International Ontology for the Intelligence Community (OIC) Conference, 5 pages; Dec. 3-4, 2008.

Petersen, Ulrik; Automatic Lexicon-based Ontology-creation, A methodological study; Master's Thesis research paper; Aalborg University; Jan. 6, 2003; 47 pages.

Volkel et al., Semversion: An RDF-Based Ontology Versioning System, IADIS International Conference WWW/Internet 2006, pp. 195-202.

Ostrovsky et al., Efficiently Merging Graph Nodes With Application to Cluster Analysis, Apr. 20, 2007, 13 pages.

International Search Report and Written Opinion (Mail Date Jun. 11, 2013); International Application No. PCT/IB2013/051823; Filing Date Mar. 7, 2013; 8 pages.

Morita et al.; Information Integration with Linked Data; Jounral of the Japanese Society for Artificial Intelligence; vol. 27, No. 2; Mar. 1, 2012; pp. 189-199.

Nakayama et al.; A Method based on NLP with Link Structure Mining to Construct a Web Ontology for Wikipedia; The Institute of Electronics, Information nad Communication Engineers; the Journal of 19th Data Engineering Workshop; Apr. 7, 2008; pp. 1-6.

Tamagawa et al.; Learning a Large Scale of Ontology from Japanese Wikipedia, Transaction of the Japanese Society for Artificial Intelligence; vol. 25 (2010), No. 5; The Japanese Society for Artificial Intelligence; Aug. 17, 2010; pp. 623-636 [retrieved from the Internet Jun. 3, 2013] ,URL httosL//www.jstage.jst.go.jp/article/tjs ai/25/5/25_5_623/_article/-char/ja/>.

U.S. Appl. No. 12/916,456, filed Oct. 29, 2010.

U.S. Appl. No. 13/589,614, filed Aug. 20, 2012.

Notice of Allowance (Mail Date May 8, 2013) for U.S. Appl. No. 13/589,614, filed Aug. 20, 2012.

U.S. Appl. No. 13/432,120, filed Mar. 28, 2012.

Halpin; Ontological Modeling; May 17, 2011; www.orm.net (From Internet Wayback Machine); retrieved from the Internet Sep. 20, 2013; 51 pages in PTO892 in connection with Non-Final Office Action dated Sep. 26, 2013—U.S. Appl. No. 13/432,120).

Peroni, et al.; Identifying key concepts in an ontology through the integration of cognitive principles with statistical and topological measures; 2009 (From Internet Wayback Machine URL: web.archive. org/web/20090615000000*/ http :1/ people.k mi.open. a c.u k/motta/ ... /key_c oncepts_aswc.pdf); Retrieved from the Internet Sep. 21, 2013; 16 pages (in PTO892 in connection with Non-Final Office Action dated Sep. 26, 2013—U.S. Appl. No. 13/432,120).

Amendment filed Dec. 24, 2013 in response to Office Action (Mail Date Sep. 26, 2013) for U.S. Appl. No. 13/432,120, filed Mar. 28, 2012.

(56) References Cited

OTHER PUBLICATIONS

Office Action (Mail Date Sep. 26, 2013) for U.S. Appl. No. 13/432,120, filed Mar. 28, 2012.

Office Action (Mail Date Oct. 25, 2013) for U.S. Appl. No. 12/916,456, filed Oct. 29, 2010.

Notice of Allowance (Mail Date Jan. 27, 2014) for U.S. Appl. No. 13/432,120, filed Mar. 28, 2012.

Notice of Allowance (Mail Date Mar. 7, 2014) for U.S. Appl. No. 12/916,456, filed Oct. 29, 2010.

Amendment filed Feb. 3, 2014 in response to Office Action (Mail Date Oct. 25, 2013) for U.S. Appl. No. 12/916,456, filed Oct. 29, 2010.

List of IBM Patents or Patent Applications Treated as Related; attached Jun. 11, 2014; 1 page.

DETERMINING THE VALUE OF AN ASSOCIATION BETWEEN ONTOLOGIES

This application is a continuation application claiming priority to Ser. No. 13/589,614 filed Aug. 20, 2012.

RELATED APPLICATION

This application is related to U.S. patent application Ser. No. 12/916,456; U.S. Patent Application Publication No. 2011/0153539) entitled "IDENTIFYING COMMON DATA OBJECTS REPRESENTING SOLUTIONS TO A PROBLEM IN DIFFERENT DISCIPLINES," filed on Oct. 29, 2010, and U.S. patent application Ser. No. 13/432,120 entitled "BUILDING AN ONTOLOGY BY TRANSFORMING COMPLEX TRIPLES," filed Mar. 28, 2012, both of which are hereby incorporated by reference in their entirety.

TECHNICAL FIELD

The present invention relates to a data processing method and system for knowledge management, and more particularly to a technique for determining a value of a merge of two ontologies.

BACKGROUND

An ontology is a representation of knowledge by a set of concepts and relationships between the concepts, where the knowledge is included within one or more software-based applications. Merging (i.e., associating) ontologies that address the same knowledge domain includes aligning the concepts and relationships of the schemas underlying the ontologies so as to create a mapping between the schemas. Merging ontologies that address different knowledge domains may include aligning the schemas underlying the ontologies by interacting with an end user and an upper reference ontology instead of a domain-specific ontology, or by ensuring that the schemas are built using the same method and the same reference ontology. When two schemas that are in the same domain or different domains are aligned, the schemas may be merged by connecting the concepts that are common to the two schemas. In the case of the schemas belonging to the same domain, a merge of the two schemas makes new structures (i.e., relationships) apparent, which completes the knowledge of the domain. In the case of the schemas belonging to different domains, the merge of the two schemas creates new cross-domain structures that do not exist in the individual schemas and that are potential sources of innovation.

SUMMARY

In first embodiments, the present invention provides a method of determining a value of a bridge of a first ontology schema with a second ontology schema. The method includes the steps of:

a computer generating the bridge of the first ontology schema (S1) with the second ontology schema (S2) by identifying significant concepts included in S2, creating a sub-schema S based on the identified significant concepts, and importing the sub-schema S into S1 to complete a generation of the bridge of S1 with S2;

the computer extracting the sub-schema S from the bridge of S1 with S2;

the computer creating a schema S' from sub-schema S by removing common concepts from S, removing from S relationships to the common concepts, and for each common concept to which first and second concepts have immediate links in S, the computer creating a new immediate link in S' between the first and second concepts, the common concepts being concepts that S1 and S2 have in common;

the computer determining an intrinsic value of S';

the computer determining a strength of a bridge of S1 with S; and based on the intrinsic value of S' and the strength of the bridge of S1 with S, the computer determining the value of the bridge of S1 with S2.

In second embodiments, the present invention provides a computer system including a central processing unit (CPU), a memory coupled to the CPU, and a computer-readable, tangible storage device coupled to the CPU. The storage device contains instructions that, when carried out by the CPU via the memory, implement a method of determining a value of a bridge of a first ontology schema with a second ontology schema. The method includes the steps of:

the computer system generating the bridge of the first ontology schema (S1) with the second ontology schema (S2) by identifying significant concepts included in S2, creating a sub-schema S based on the identified significant concepts, and importing the sub-schema S into S1 to complete a generation of the bridge of S1 with S2;

the computer system extracting the sub-schema S from the bridge of S1 with S2;

the computer system creating a schema S' from sub-schema S by removing common concepts from S, removing from S relationships to the common concepts, and for each common concept to which first and second concepts have immediate links in S, the computer system creating a new immediate link in S' between the first and second concepts, the common concepts being concepts that S1 and S2 have in common;

the computer system determining an intrinsic value of S';

the computer system determining a strength of a bridge of S1 with S; and based on the intrinsic value of S' and the strength of the bridge of S1 with S, the computer system determining the value of the bridge of S1 with S2.

In third embodiments, the present invention provides a computer program product including a computer-readable, tangible storage device and computer-readable program instructions stored in the computer-readable, tangible storage device. The computer-readable program instructions, when carried out by a central processing unit (CPU) of a computer system, implement a method of determining a value of a bridge of a first ontology schema with a second ontology schema. The method includes the steps of:

the computer system generating the bridge of the first ontology schema (S1) with the second ontology schema (S2) by identifying significant concepts included in S2, creating a sub-schema S based on the identified significant concepts, and importing the sub-schema S into S1 to complete a generation of the bridge of S1 with S2;

the computer system extracting the sub-schema S from the bridge of S1 with S2;

the computer system creating a schema S' from sub-schema S by removing common concepts from S, removing from S relationships to the common concepts, and for each common concept to which first and second concepts have immediate links in S, the computer system creating a new immediate link in S' between the first and second concepts, the common concepts being concepts that S1 and S2 have in common;

the computer system determining an intrinsic value of S';

the computer system determining a strength of a bridge of S1 with S; and based on the intrinsic value of S' and the strength of the bridge of S1 with S, the computer system determining the value of the bridge of S1 with S2.

In fourth embodiments, the present invention provides a process for supporting computing infrastructure. The process includes a first computer system providing at least one support service for at least one of creating, integrating, hosting, maintaining, and deploying computer-readable code in a second computer system. The computer-readable code contains instructions. The instructions, when carried out by a processor of the second computer system, implement a method of determining a value of a bridge of a first ontology schema with a second ontology schema. The method includes the steps of:

the second computer system generating the bridge of the first ontology schema (S1) with the second ontology schema (S2) by identifying significant concepts included in S2, creating a sub-schema S based on the identified significant concepts, and importing the sub-schema S into S1 to complete a generation of the bridge of S1 with S2;

the second computer system extracting the sub-schema S from the bridge of S1 with S2;

the second computer system creating a schema S' from sub-schema S by removing common concepts from S, removing from S relationships to the common concepts, and for each common concept to which first and second concepts have immediate links in S, the second computer system creating a new immediate link in S' between the first and second concepts, the common concepts being concepts that S1 and S2 have in common;

the second computer system determining an intrinsic value of S';

the second computer system determining a strength of a bridge of S1 with S; and based on the intrinsic value of S' and the strength of the bridge of S1 with S, the second computer system determining the value of the bridge of S1 with S2.

Embodiments of the present invention allow merges between ontologies to be ranked according to the richness of the associations between the schemas underlying the ontologies. By ranking the merges between ontologies, an end user or application may save time by focusing by priority on those merges that have the highest rankings. End users and applications that may become more efficient by focusing on higher ranked merges of ontologies include (1) a network of inventors who are attempting to solve a technical challenge with a solution from another discipline or another area of expertise; (2) an intelligent web navigation system that allows a user navigating on the web to be guided from one website to another website through associations between the ontologies representing the websites; and (3) a question and answer system in which an answer given by the system triggers new questions from a user.

DETAILED DESCRIPTION

Overview

Figure 1:
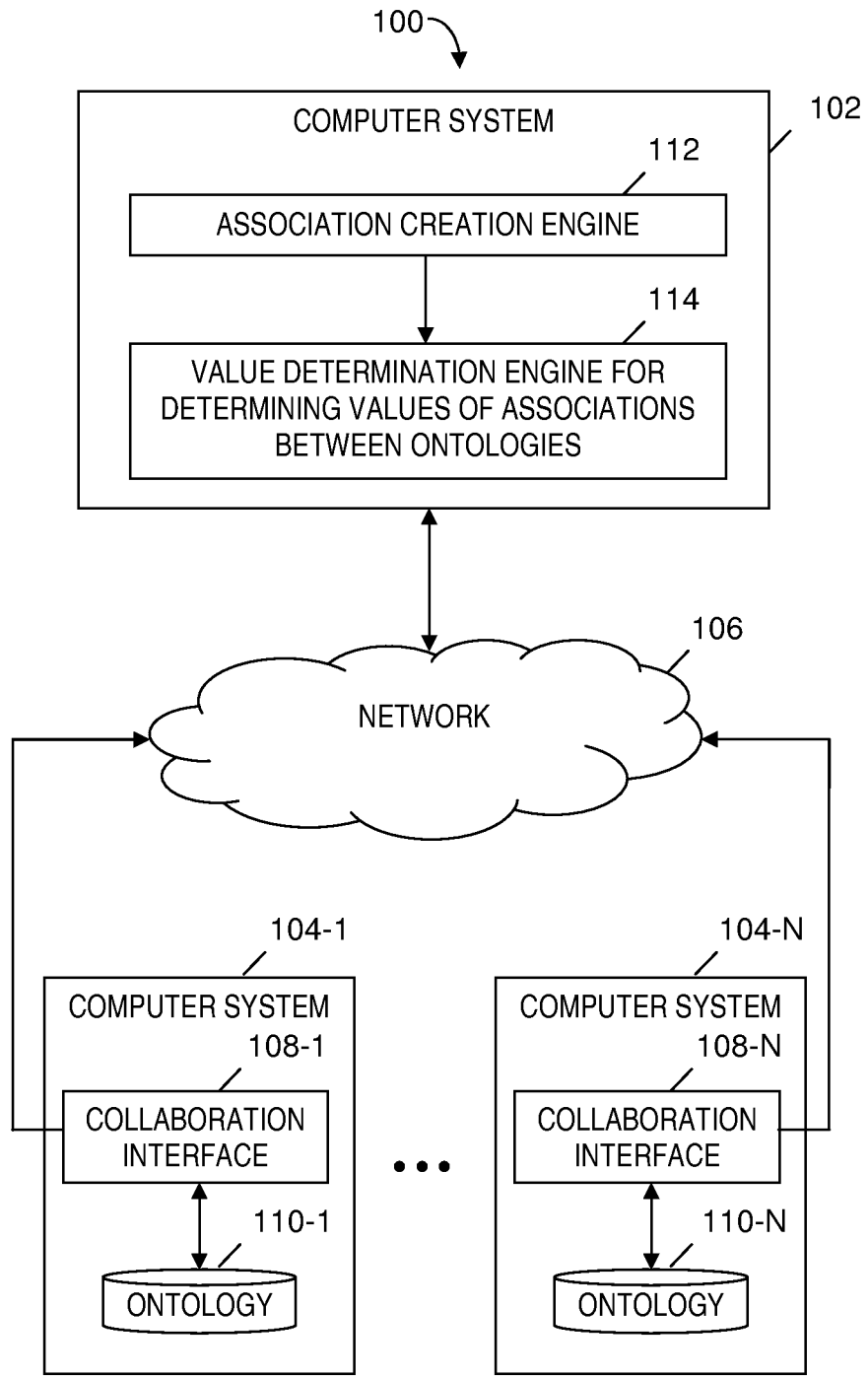
FIG. 1 is a block diagram of a system for determining a value of an association between ontologies, in accordance with embodiments of the present invention.

When two ontologies are merged (i.e., the ontology schemas underlying the ontologies are merged), new relationships (i.e., new semantics) are formed, which can be sources of innovations when the merged ontology schemas are from different knowledge domains. Embodiments of the present invention determine a value of an association or merge between two ontology schemas. Two ontology schemas may be associated (i.e., merged) whenever the two ontology schemas have some common concepts (i.e., some concepts that are identical or similar between the two ontology schemas; also known as (a.k.a.) shared concepts). A merge of ontology schema S1 with ontology schema S2 includes an import into S1 of the chains of S2 concepts that are connected to the common concepts. These imported chains bring a set of new relationships and new concepts to S1. In one embodiment, the value of an association between two ontology schemas varies directly with the number of concepts imported to one of the ontology schemas and the number of new relationships created by the association.

The number of possible merges with a given ontology schema may be significant in a network or a collaboration environment involving many users (e.g., the network is the World Wide Web). Values of the merges may be determined based on a richness of associations between the given ontology schema and the other ontology schemas. The richness of an association depends on the new structures created by the merge. Using the values of the merges, the merges may be ranked; thereby allowing an end user or application to use less time to efficiently consider only higher ranked merges instead of taking a significant amount of time to consider all the merges, including the merges that have little or no value.

As used herein, an ontology schema is also referred to simply as a schema. As used herein, a value of an association between ontologies is a value of an association between the schemas underlying the ontologies. A value of an association between schemas S1 and S2 is determined by the addition of two values: (1) the value of a bridge of S1 with S2; and (2) the value of a bridge of S2 with S1. The value of the bridge of S1 with S2 is determined by performing the following steps: (1) creating a bridge of S1 with S2, which includes (a) identifying the common concepts shared between S1 and S2; (b) identifying in S2 the significant concepts that have a relationship with one or more of the identified common concepts (i.e., the concepts in S2 that have the most relevance to S1); and (c) importing the identified significant concepts into S1; (2) identifying the sub-schema that has been imported into S1; (3) computing an intrinsic value of the sub-schema based on a graph density (i.e., compactness of the sub-schema); (4) computing a strength of the bridge, based on the position and importance of the common concepts in the schemas S1 and S2; and (5) computing the value of the bridge based on the intrinsic value and strength of the bridge computed in (3) and (4), respectively. It should be noted that steps (a), (b) and (c) discussed above describe an operation "bridging S1 with S2," which is a particular merge of S1 with a sub-schema of S2 that includes only the structures relevant to S1. The schema resulting from bridging S1 with S2 is referred to herein as the bridge of S1 with S2, or Bridge(S1,S2).

The value of the bridge of S2 with S1 is determined as described above in the steps (1)-(5), in the same way as the value of the bridge of S1 with S2 is determined, except that S1 is replaced with S2 and S2 is replaced with S1.

In one embodiment, the value of a bridge of a first ontology schema with a second ontology schema is determined so that the value depends on the strength of a bridge of the first ontology schema with an imported sub-schema. To take account of the position and importance of the common concepts in the two schemas, the strength of the bridge may be a summation, over each of the shared concepts, of the following quotient: the number of immediate links from the imported sub-schema to the shared concept divided by the distance of the shared concept to the first ontology schema. The distance of the shared concept to the first schema is the shortest distance between the shared concept and any of the concepts which have a maximum weight in the first schema. Therefore, the bridge is stronger (i.e., has more value) if the imported sub-schema is close to the central concepts of the first schema.

Although embodiments are described herein in terms of determining values and rankings of merges of ontologies or merges of ontology schemas underlying the ontologies, variations are contemplated in which values and rankings may be determined for semantic schemas. As used herein, a semantic schema is defined as a meta-schema that describes a universe of discourse of a software-based application or an end user. A semantic schema may be an ontology or a conceptual data model.

System for Determining a Value of an Association Between Ontologies

FIG. 1 is a block diagram of a system for determining a value of an association between ontologies, in accordance with embodiments of the present invention. System 100 includes a computer system 102 in communication with computer systems 104-1 . . . 104-N via a computer network 106, where N is an integer and N>1.

Computer systems 104-1 . . . 104-N run software-based collaboration interfaces 108-1 . . . 108-N, respectively, and include ontologies 110-1 . . . 110-N respectively. In one embodiment, computer network 106 provides a collaboration network among users, where each ontology of ontologies 110-1 . . . 110-N describes a universe of discourse of a corresponding user of the collaboration network, and where the users may utilize collaboration interfaces 108-1 . . . 108-N to share the ontologies 110-1 . . . 110-N via network 106.

In one embodiment, ontology schemas (not shown) underlying respective ontologies 110-1 . . . 110-N are aligned and each user who wants to benefit from the semantic capabilities of network 106 uses the same schema builder (not shown) to build the ontology schemas (e.g., using the same method and reference ontology as described in U.S. patent application Ser. No. 13/432,120 entitled "BUILDING AN ONTOLOGY BY TRANSFORMING COMPLEX TRIPLES."

Ontologies 110-1 . . . 110-N may be specified respectively by N different ontology schemas, or two or more ontologies in ontologies 110-1 . . . 110-N may by specified by the same ontology schemas.

A collaboration network provided by network 106 may be specialized or non-specialized. For example, a specialized collaboration network may be a network of inventors who want to share their knowledge and questions in order to find innovative solutions to challenges, as described in U.S. patent application Ser. No. 12/916,456 (Attorney Docket No. GB920090029US1) entitled "IDENTIFYING COMMON DATA OBJECTS REPRESENTING SOLUTIONS TO A PROBLEM IN DIFFERENT DISCIPLINES." As another example, the collaboration network may be a network of people collaborating in a project, a game, a social network, etc., where the people in the network want to discover possible associations between their universes of discourse or centers of interest. As an example of a non-specialized network, the network may be the World Wide Web itself, specifically the Semantic Web.

Computer system 102 runs a software-based association creation engine 112, which merges (i.e., associates) ontologies included in ontologies 110-1 . . . 110-N. In one embodiment, ontologies merged by association creation engine 112 enrich a collaboration provided by network 106. Computer system 102 also runs a value determination engine 114 for determining values of associations between ontologies, where the associations are created by association creation engine 112. The values determined by value determination engine 114 allow the collaboration networks provided by network 106 to save time by not considering a merge between ontologies where the merge has no value. In one embodiment, computer system 102 ranks associations between ontologies based on the values determined by value determination engine 114. The ranked associations may allow end users in a collaboration network to efficiently utilize their time by focusing only on the merges that have the highest ranks The functionality of the components shown in FIG. 1 is described in more detail below in the discussions of FIG. 2, FIG. 3, FIG. 4, FIG. 5, FIG. 6, FIG. 7 and FIG. 8.

Process for Determining a Value of an Association Between Ontologies

Figure 2:
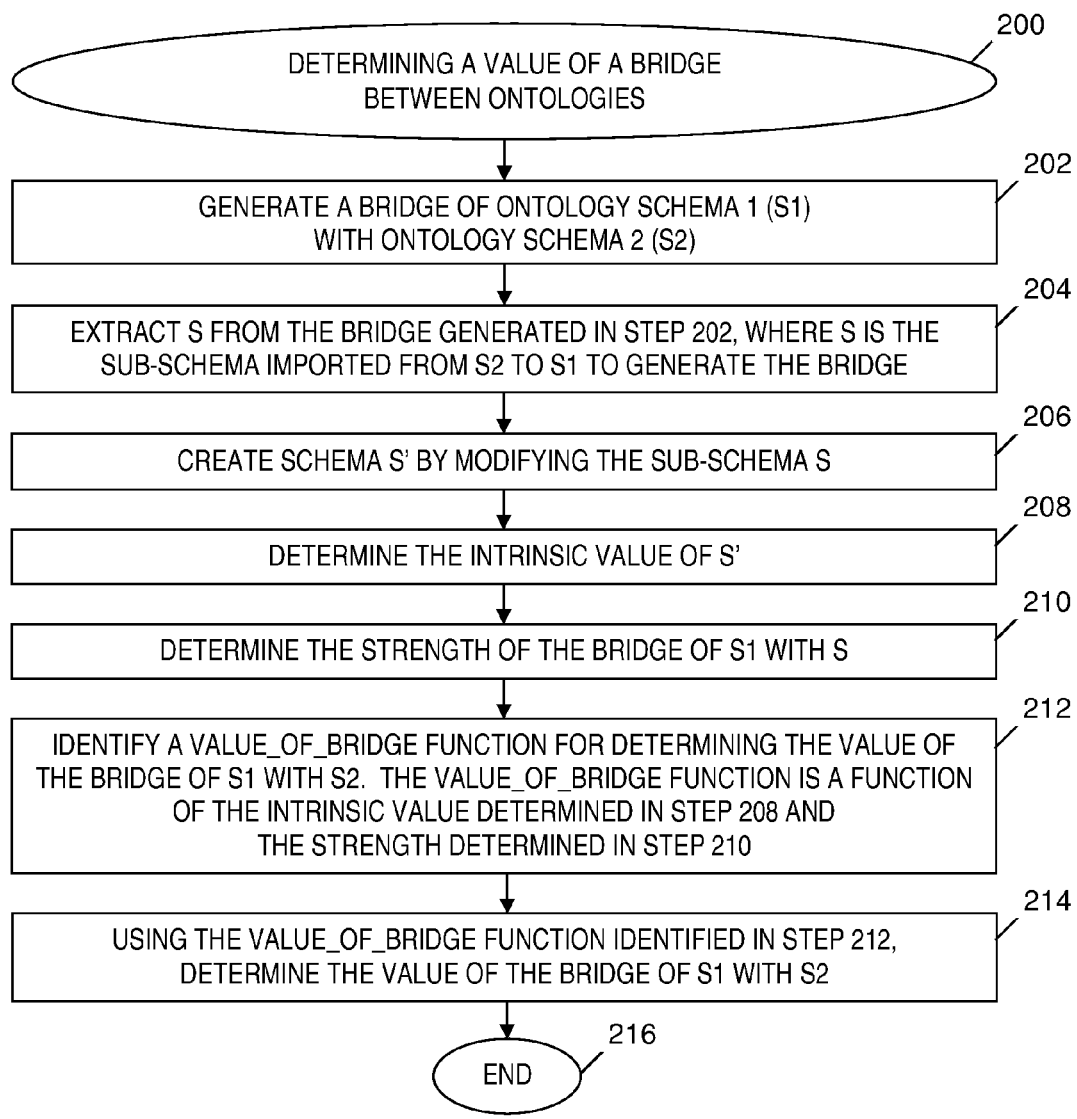
FIG. 2 is a flowchart of a process of determining a value of a bridge between ontologies, where the process is implemented in the system of FIG. 1, in accordance with embodiments of the present invention.

FIG. 2 is a flowchart of a process of determining a value of a bridge between ontologies, where the process is implemented in the system of FIG. 1, in accordance with embodiments of the present invention. The process of determining a value of the bridge between ontologies starts at step 200. In step 202, association creation engine 112 (see FIG. 1) generates a bridge of a first ontology schema (i.e., S1) with a second ontology schema (i.e., S2) by creating a bridge function: Bridge(S1,S2). S1 specifies a first ontology included in ontologies 110-1 . . . 110-N (see FIGS. 1) and S2 specifies a second ontology included in ontologies 110-1 . . . 110-N (see FIG. 1).

The creation of Bridge(S1,S2) in step 202 includes identifying concepts that S1 and S2 have in common, identifying significant concepts in S2, creating a sub-schema S of S2 based on the significant concepts, and importing S into S1. Creating Bridge(S1,S2) is described in more detail below in the discussion of FIG. 3. Bridge(S1,S2) created in step 202 is also referred to herein simply as the bridge or the bridge of S1 with S2.

In step 204, value determination engine 114 (see FIG. 1) identifies sub-schema S by extracting S from the bridge, where S has been imported from S2 to S1 to create the bridge.

In step 206, value determination engine 114 (see FIG. 1) creates an independent, isolated schema S' by modifying the sub-schema S extracted in step 204. The creation of schema S' is described in more detail below in the discussion of FIG. 5.

Figure 5:
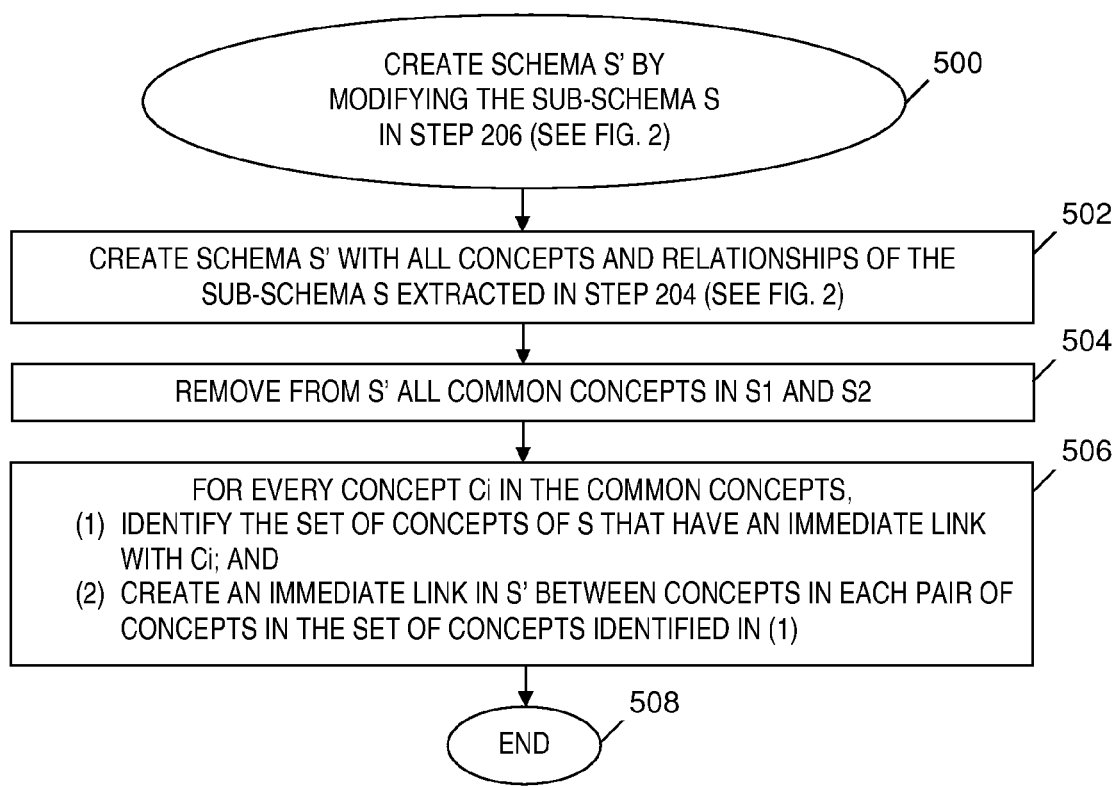
FIG. 5 is a flowchart of a process of creating a schema by modifying the sub-schema extracted in the process of FIG. 2, in accordance with embodiments of the present invention.

In another embodiment, a user using collaboration interface 108-1 (see FIG. 1) or another collaboration interface may define the schema S' or specify how to create schema S', such as using the steps in FIG. 5. In one embodiment, the user utilizes the aforementioned collaboration interface to specify which concepts of sub-schema S have enough value to be kept in schema S'. In one embodiment, by default, value determination engine 114 (see FIG. 1) considers that all concepts of S are valuable and must be kept in schema S'. In one embodiment, by default, value determination engine 114 (see FIG. 1) creates schema S' automatically as described below in the discussion of FIG. 5.

In step 208, value determination engine 114 (see FIG. 1) determines an intrinsic value of ontology schema S' created in step 206. The intrinsic value determined in step 208 measures the value of schema S' independently from the relationships S' has with ontology schema S1. The intrinsic value is determined in step 208 by evaluating a function Intrinsic Value that is described below in the discussion of FIG. 6.

In one embodiment, a user utilizes collaboration interface 108-1 (see FIG. 1) or another collaboration interface to provide the user's own intrinsic value of S1 or the user's own function Intrinsic_Value.

In one embodiment, by default, value determination engine 114 (see FIG. 1) provides an Intrinsic_Value function and evaluates the Intrinsic_Value function to automatically compute the intrinsic value of S'. The Intrinsic_Value function depends on the number of concepts in S' and the density of a graph representing S' (i.e., compactness of the concepts in S', which describes the richness of S' as a balance between the number of concepts in S' and the number of links between the concepts in S'). In one embodiment, value determination engine 114 (see FIG. 1) is adaptable by accepting another default Intrinsic_Value function, if required.

In step 210, value determination engine 114 (see FIG. 1) determines a strength of the bridge of ontology schema S1 with sub-schema S. In one embodiment, the strength determined in step 210 measures the value of the liaison (i.e., association) between S1 and S. In one embodiment, value determination engine 114 (see FIG. 1) evaluates a function Strength_of_bridge to determine the strength of the bridge of S1 with S, as described below in the discussion of FIG. 7. The Strength_of_bridge function depends on (1) the number of immediate links that every common concept has with other concepts of S; and (2) the distance that every common concept has with the central concepts of the first schema. The central concepts of a schema are the concepts in the schema that have the highest weight, where the weight of a concept is discussed in more detail below.

In one embodiment, a user utilizes collaboration interface 108-1 (see FIG. 1) or another collaboration interface to provide the user's own value of the strength of the association between S1 and S or provide the user's own function Strength_of_bridge.

In one embodiment, by default, value determination engine 114 (see FIG. 1) provides a Strength_of_bridge function and automatically computes the strength of the bridge of S1 with S. In one embodiment, value determination engine 114 (see FIG. 1) is adaptable by accepting another default Strength_of_bridge function, if required.

In step 212, value determination engine 114 (see FIG. 1) identifies or creates a function Value_of_Bridge that will be used to compute the value of the bridge of S1 with S2. The function Value_of_Bridge depends at least on (1) the intrinsic value of S' determined in step 208 and (2) the strength of the bridge of S1 with S determined in step 210.

In one embodiment, a user utilizes collaboration interface 108-1 (see FIG. 1) or another collaboration interface to provide the user's own function Value_of_Bridge, or provide the user's own value of the bridge of S1 with S2. In the case of the user providing the user's own value of the bridge in step 212, the process of FIG. 2 ends without proceeding to step 214.

In one embodiment, by default, value determination engine 114 (see FIG. 1) provides a Value_of_Bridge function. In one embodiment, value determination engine 114 (see FIG. 1) is adaptable by accepting another default Value_of_Bridge function, if required.

In one embodiment, by default, value determination engine 114 (see FIG. 1) determines Value_of_Bridge(S1,S2)=Value_of_Bridge(S1,S)=Intrinsic value(S')* Strength_of_Bridge(S1,S). As used herein, * is a multiplication symbol.

In step 214, value determination engine 114 (see FIG. 1) uses the Value_of_Bridge function identified or created in step 212 to determine the value of the bridge of ontology schema S1 with ontology schema S2.

The process of FIG. 2 ends at step 216.

In one embodiment, the process of FIG. 2 may be repeated to generate multiple bridges of S1 with S2, S3, . . . Sn and to determine the value of the multiple bridges. Based on the values of the bridges, value determination engine 114 (see FIG. 1) ranks the associations between the S1 and S2, between S1 and S3, . . . between S1 and Sn (i.e., a higher value of a bridge means a higher ranking of the corresponding association). Based on the ranking of the associations, an end user may focus by priority only on the ontology schemas whose associations with S1 have the highest ranks, and avoid considering associations that have the lowest ranks, including the associations that have no value.

Figure 3:
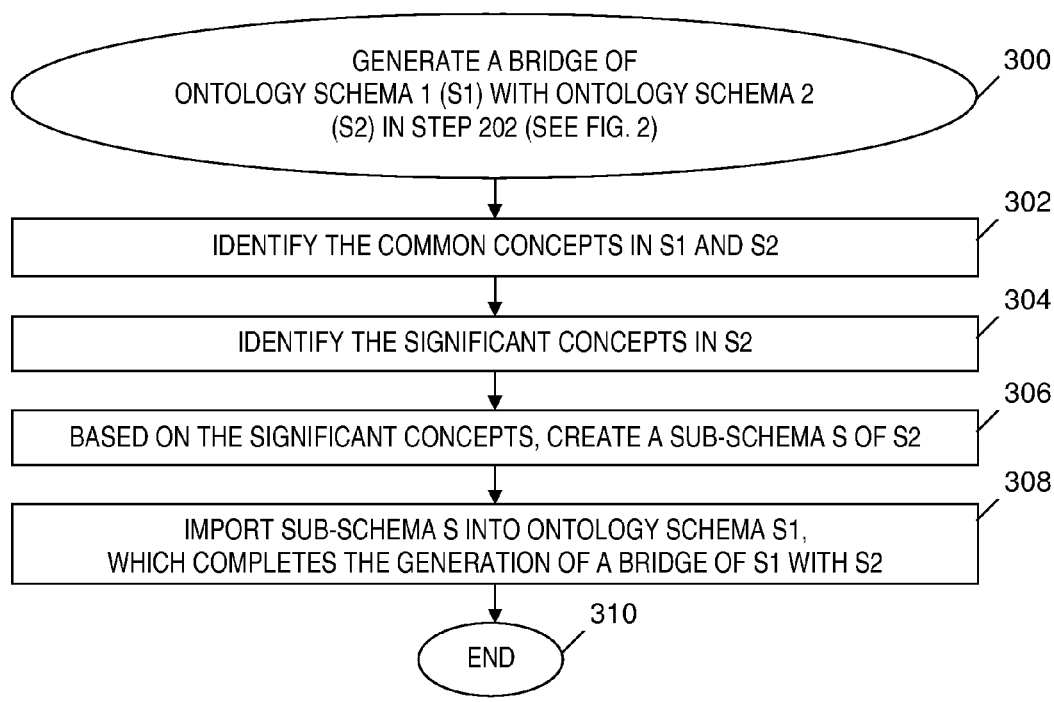
FIG. 3 is a flowchart of a process of generating a bridge of a first ontology schema with a second ontology schema, where the process is included in the process of FIG. 2, in accordance with embodiments of the present invention.

FIG. 3 is a flowchart of a process of generating a bridge of a first ontology schema with a second ontology schema, where the process is included in the process of FIG. 2, in accordance with embodiments of the present invention. The process of FIG. 3 begins at step 300. In one embodiment, the steps of FIG. 3 are included in step 202 (see FIG. 2). In step 302, value determination engine 114 (see FIG. 1) identifies a set of common concepts {Cc} (i.e., concepts that ontology schema S1 and ontology schema S2 have in common and concepts in S1 and S2 that are similar). In one embodiment, value determination engine 114 (see FIG. 1) utilizes similarity measures to identify the common concepts in step 302. Those skilled in the art will recognize techniques that can be used to obtain the aforementioned similarity measures.

Embodiments of the present invention do not import all concepts of ontology schema S2 into ontology schema S1; instead value determination engine 114 (see FIG. 1) imports only the concepts of S2 that are the most relevant or significant. In step 304, value determination engine 114 (see FIG. 1) identifies a set {Cs} of significant concepts in ontology schema S2 by identifying the concepts in S2 that are significant with respect to the set of common concepts {Cc}. The set {Cs} identified in step 304 includes only the concepts of S2 that are the most relevant or significant. A significant concept is a concept that provides some value to the bridge of S1 with S2.

In one embodiment, an end user defines what concepts in S2 are significant and the value determination engine 114 (see FIG. 1) receives those concepts from the end user.

In one embodiment, by default, value determination engine 114 (see FIG. 1) automatically identifies what concepts in S2 are significant. The value determination engine 114 (see FIG. 1) considers a concept Ci significant with respect to the set of common concepts {Cc} if (1) Ci=Cj, where Cj belongs to {Cc}, or (2) the function Significance(Ci) is above a given threshold (i.e., the significance threshold) defined prior to the start of the process of FIG. 3. To identify the significant concepts in S2 in step 304, value determination engine 114 (see FIG. 1) needs to utilize a Significance(Ci) function and a significance threshold, which are described in more detail below in the discussion of FIG. 4.

In step 306, value determination engine 114 (see FIG. 1) creates the sub-schema S (i.e., the sub-schema of ontology schema S2, which is to be imported into ontology schema S1) based on the set of significant concepts {Cs}. The sub-schema S is made of all significant concepts identified in step 304 and all relationships the aforementioned significant concepts have among themselves in ontology schema S2.

In step 308, value determination engine 114 (see FIG. 1) imports the sub-schema S created in step 306 into ontology schema S1.

After performing step 308, the function Bridge(S1,S2) has been built if there exists any non-common concept in ontology schema S2 that is more significant that the significance threshold; otherwise, the function Bridge(S1,S2) has not been built. In the case in which the function Bridge(S1,S2) has not been built after performing step 308, the bridge of S1 with S2 is considered to be not valuable.

The process of FIG. 3 ends at step 310.

Figure 4:
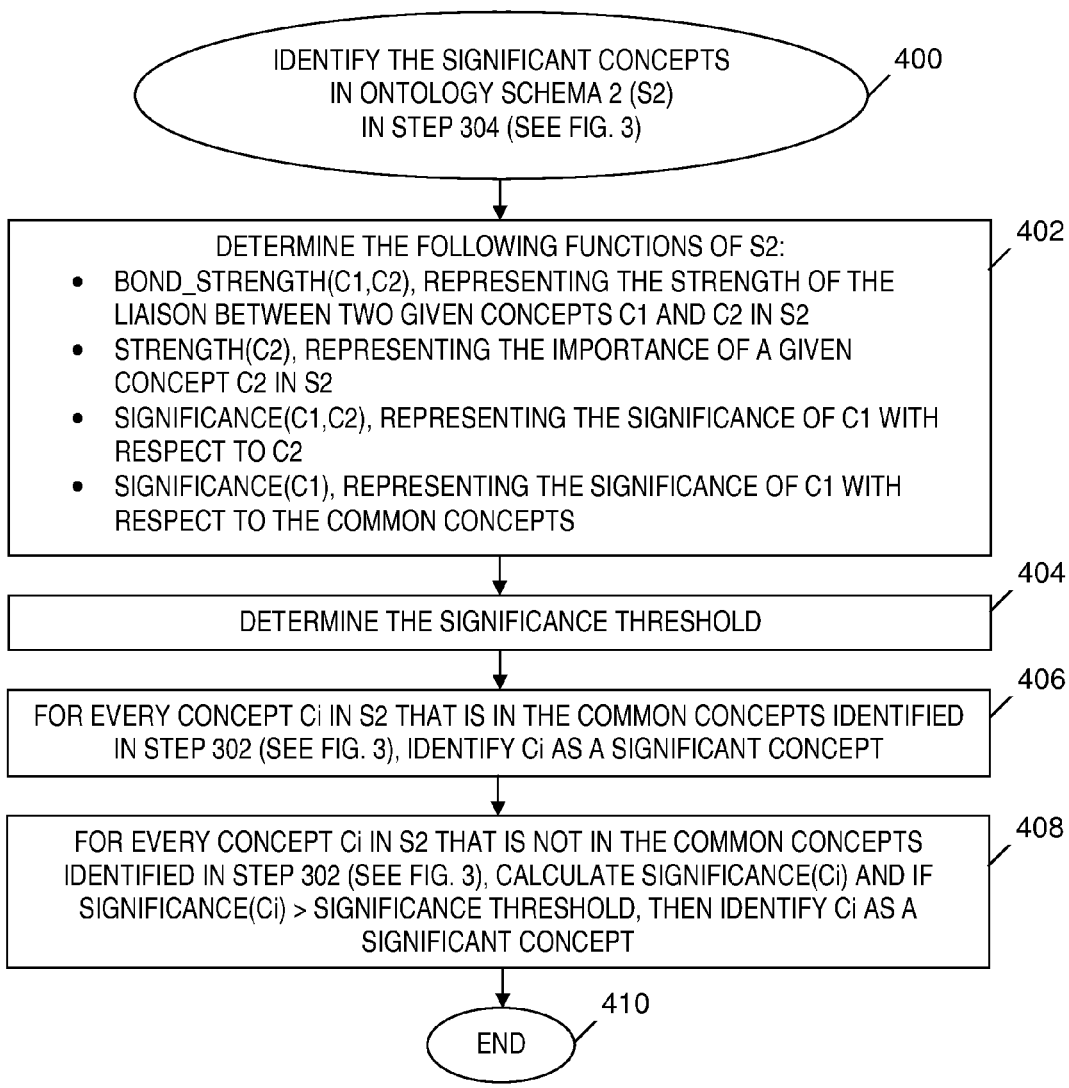
FIG. 4 is a flowchart of a process of identifying the significant concepts in the second ontology schema in the bridge generated in the process of FIG. 3, in accordance with embodiments of the present invention.

FIG. 4 is a flowchart of a process of identifying the significant concepts in a second ontology schema, where the process is included in the process of FIG. 3, in accordance with embodiments of the present invention. The process of FIG. 4 begins at step 400. In one embodiment, the steps of FIG. 4 are included in step 304 (see FIG. 3). In step 402, value determination engine 114 (see FIG. 1) determines the following functions of ontology schema S2:

bond_strength(C1,C2), representing the strength of the liaison between two given concepts C1 and C2 in ontology schema S2.

strength(C2), representing the importance of a given concept C2 in ontology schema S2.

significance(C1,C2), representing the significance of C1 with respect to C2, where C1 and C2 are concepts in ontology schema S2. The significance(C1,C2) function is a function of bond_strength(C1,C2) and strength(C2).

significance(C1), representing the significance of C1 with respect to the common concepts identified in step 302 (see FIG. 3). The significance(C1) function is a function of significance(C1,Ci), where Ci belongs to the set {Cc} identified in step 302 (see FIG. 3).

In an alternate embodiment, an end user provides the significance(C1) function by utilizing collaboration interface 108-1 (see FIG. 1) or another collaboration interface. In another embodiment, the aforementioned significance function may depend on an ontology, such as the ontology provided by ontology schema S1, or may depend on the structure of S1.

In one embodiment, by default, value determination engine 114 (see FIG. 1) determines significance(Ci)=Σ[significance (Ci,Cc)], where Cc is an element in the set of common concepts identified in step 302 (see FIG. 3). In one embodiment, value determination engine 114 (see FIG. 1) is adaptable by accepting other defaults for significance(Ci), if required. As described above, the definition of the significance(Ci) function requires a definition of significance(Ci,Cj), where Ci is a concept in ontology schema S2 and Cj is a common concept identified in step 302 (see FIG. 3). The value of significance (Ci) increases as the value of the strength of the liaison between Ci and Cj increases (i.e., as the value of bond_strength(Ci,Cj) increases). Furthermore, the value of significance(Ci) increases as the intrinsic importance of Ci in ontology schema S2 increases (i.e., as the value of strength(Ci) increases).

The value determination engine 114 (see FIG. 1) determines the aforementioned bond_strength(Ci,Cj) and strength (Ci) functions in step 402. In another embodiment, an end user provides the bond_strength and strength functions by utilizing collaboration interface 108-1 (see FIG. 1) or another collaboration interface. The bond_strength and strength functions may also depend on one of the ontology schemas or depend on the structure of ontology schema S2.

In one embodiment, value determination engine 114 (see FIG. 1) determines a default bond_strength(Ci,Cj) function and a default strength(Cj) function, but value determination engine 114 (see FIG. 1) is adaptable by accepting other defaults, if required.

In one embodiment, by default, value determination engine 114 (see FIG. 1) determines bond_strength(C1,C2) to be equal to a function of the number and length of chains between C1 and C2. In one embodiment, value determination engine 114 (see FIG. 1) determines bond_strength(C1,C2)=Σ

[1/(1+length(chain))], for each chain between C1 and C2. In the aforementioned definition of bond_strength(C1,C2), every link between two concepts is supposed to have the same length. The value determination engine 114 (see FIG. 1) may consider that some links are stronger than others and give those links a lower length. Two concepts are close when the concepts are associated with a link of low length. For instance, a relationship "is_a" is given a length=0, thereby forcing length (Ci,Cj) to be the same as length(Ci,Cx), where Cx is a parent or child of Cj. This forcing of length(Ci,Cj) to be the same as length(Ci,Cx) may be used to assign the same significance to Cj and all of its parents and children, thereby forcing an import into ontology schema S1 of the significant concepts with their child and parent concepts.

In one embodiment, by default, value determination engine 114 (see FIG. 1) determines strength(Cj) to be equal to the number of concept Cj's direct links to other concepts. A direct link between two concepts C1 and C2 is defined as a chain of links and the intermediary concepts that associate C1 and C2, such that length(chain) is either zero or has the lowest possible non-zero value.

In one embodiment, by default, value determination engine 114 (see FIG. 1) determines significance(Ci,Cj) to be equal to strength(Ci)*bond_strength(Ci,Cj). In another embodiment, the significance(Ci,Cj) function may be defined differently. The default significance(Ci,Cj) function is adaptable so that value determination engine 114 (see FIG. 1) may accept another default, if required.

In step 404, value determination engine 114 (see FIG. 1) determines a significance threshold. In one embodiment, value determination engine 114 (see FIG. 1) receives the significance threshold from an end user who provides the significance threshold via collaboration interface 108-1 (see FIG. 1) or another collaboration interface. In another embodiment, value determination engine 114 (see FIG. 1) may receive the significance threshold as a threshold value that depends on an ontology, such as the ontology provided by ontology schema S1, or that depends on the structure of S1.

In step 406, for every concept Ci that is in ontology schema S2 and that is in the common concepts identified in step 302 (see FIG. 3), value determination engine 114 (see FIG. 1) identifies Ci as a significant concept and puts Ci into the set of significant concepts {Cs}.

In step 408, for every concept Ci that is in ontology schema S2 and that is not in the common concepts identified in step 302 (see FIG. 3), value determination engine 114 (see FIG. 1) evaluates significance(Ci), by evaluating the significance(Ci) function determined in step 402. Also in step 408, value determination engine 114 (see FIG. 1) determines whether significance(Ci) is greater than the significance threshold determined in step 404. If significance(Ci)>significance threshold, then value determination engine 114 (see FIG. 1) in step 408 identifies Ci as a significant concept and puts Ci into the set {Cs}.

The process of FIG. 4 ends at step 410.

By using the significance function and the significance threshold in the steps of FIG. 4, value determination engine 114 (see FIG. 1) allows the import of only the concepts that have some value in step 308 (see FIG. 3). Moreover, the utilization of the significance threshold limits the number of imported concepts in a standardized manner (i.e., the same process and the same significance threshold), for all bridges being built with the process of FIG. 3, which includes the steps of FIG. 4. The standardized manner of limiting the number of imported concepts is required for making valid comparisons between different bridge values.

FIG. 5 is a flowchart of a process of creating a schema by modifying the sub-schema extracted in the process of FIG. 2, in accordance with embodiments of the present invention. In one embodiment the steps of FIG. 5 are included in step 206 (see FIG. 2). In one embodiment, the goal of the steps of FIG. 5 is to isolate the sub-schema S extracted in step 204 (see FIG. 2) (i.e., to transform S into S' by removing all concepts that are in common with ontology schema S1). The process of FIG. 5 starts at step 500. In step 502, value determination engine 114 (see FIG. 1) creates an initial version of schema S' by including in S' all the concepts and relationships that are included in the sub-schema S extracted in step 204 (see FIG. 2) (i.e., step 502 includes value determination engine 114 (see FIG. 1) initializing S' as being equal to S).

In step 504, value determination engine 114 (see FIG. 1) removes all shared concepts from S' by removing in S' all concepts that are common to S' and ontology schema S1, and by removing in S' all relationships to the removed shared concepts. That is, value determination engine 114 (see FIG. 1) removes from S' all the concepts in {Cc}, which is the set of common concepts identified in step 302 (see FIG. 3), and removes from S' all relationships the removed common concepts had with other concepts in S'.

In step 506, for every concept Ci in {Cc}, value determination engine 114 (see FIG. 1) (1) identifies a set of concepts included in S that have an immediate link with Ci; and (2) and creates an immediate link in S' between every pair of concepts in the set of concepts included in S identified in (1). In one embodiment, step 506 includes value determination engine 114 (see FIG. 1) replacing the relationships removed in step 504 by creating artificial links in S' between all concepts that have an immediate link to the same shared concept in S. As used herein, an immediate link between two concepts is defined as a chain of exactly one link between the two concepts, without any intermediate concepts between the two concepts. That is, an immediate link is a chain of relationships having only one relationship.

The process of FIG. 5 ends at step 508.

Figure 6:
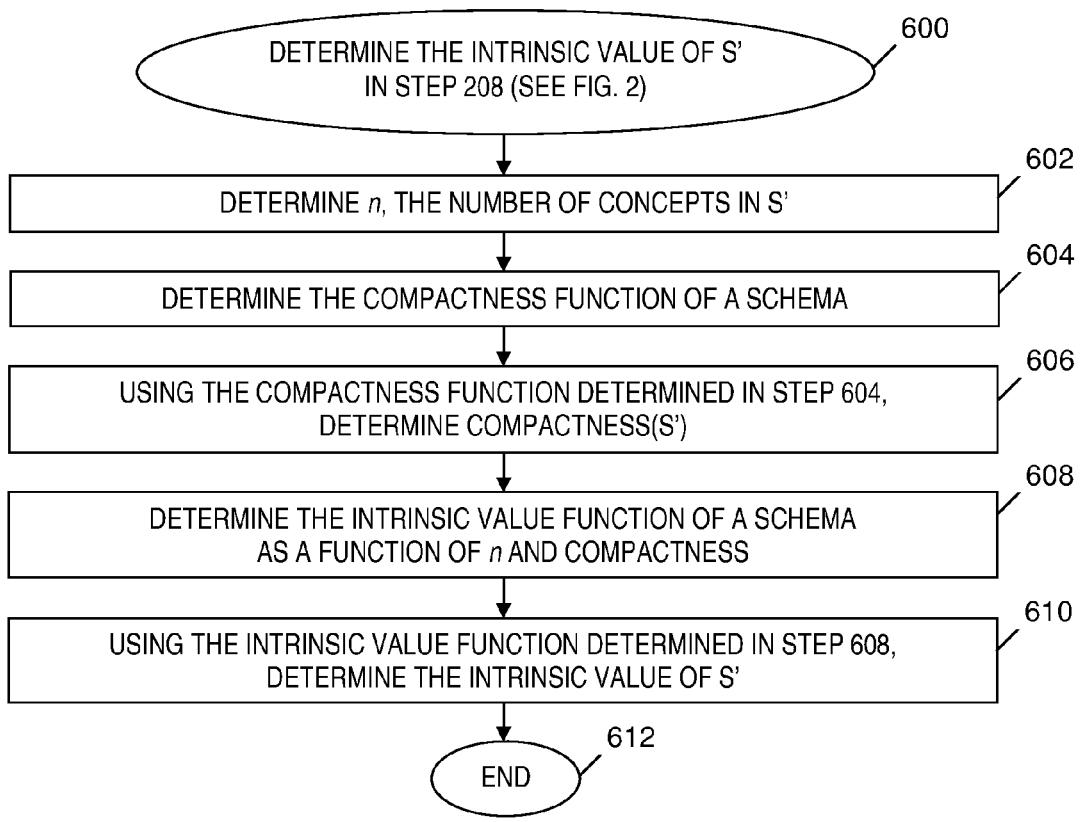
FIG. 6 is a flowchart of a process of determining an intrinsic value of the schema created in the process of FIG. 5, where the process of determining the intrinsic value is included in the process of FIG. 2, in accordance with embodiments of the present invention.

FIG. 6 is a flowchart of a process of determining an intrinsic value of the schema created in the process of FIG. 5, where the process of determining the intrinsic value is included in the process of FIG. 2, in accordance with embodiments of the present invention. In one embodiment, the steps of FIG. 6 are included in step 208 (see FIG. 2). The intrinsic value of a schema is determined by an intrinsic value function that measures the schema's semantic density (i.e., an evaluation of the schema's semantic richness). The intrinsic value function depends on n, the number of concepts in the schema, and further depends on a value representing the compactness of the schema. The process of FIG. 6 begins at step 600.

In step 602, value determination engine 114 (see FIG. 1) determines n, the number of concepts in the schema S' created in step 206 (see FIG. 2). In the process of FIG. 6, value determination engine 114 (see FIG. 1) knows that the schema S' is valuable and includes only relevant and valuable concepts.

In step 604, value determination engine 114 (see FIG. 1) determines the compactness function of a schema; i.e., determines the function Compactness( ). In one embodiment, by default, value determination engine 114 (see FIG. 1) in step 604 automatically determines the compactness function as a function of the number of links between concepts compared with the total number of possible immediate links among the concepts. The value determination engine 114 (see FIG. 1) may be adaptable by accepting another default compactness function, if required. In one embodiment, value determination engine 114 (see FIG. 1) defines the compactness function as follows:

Compactness(S')=Num_of_links(S)/(n*(n−1)/2), where Num_of_links(S') represents the number of immediate links found in S', where (n*(n−1)/2) is the total number of possible immediate links between the n concepts in S', and where an immediate link is a link between two concepts through a chain of exactly one relationship.

In another embodiment, value determination engine 114 (see FIG. 1) in step 604 receives the compactness function from an end user who provides the compactness function via collaboration interface 108-1 (see FIG. 1) or another collaboration interface.

In step 606, value determination engine 114 (see FIG. 1) determines a value representing the compactness of schema S' by evaluating the compactness function determined in step 604 (i.e., by evaluating Compactness(S')). In one embodiment, by default, value determination engine 114 (see FIG. 1) automatically computes the compactness of S' by evaluating the compactness function determined in step 604. In another embodiment, an end user in step 606 provides the value determination engine 114 (see FIG. 1) with a value of the compactness of S' by utilizing collaboration interface 108-1 (see FIG. 1) or another collaboration interface.

In step 608, value determination engine 114 (see FIG. 1) determines the intrinsic value function of a schema. In one embodiment, by default, value determination engine 114 (see FIG. 1) automatically determines the intrinsic value function as Intrinsic_Value(S')=n*Compactness(S').

In one embodiment, an end user has an option in step 608 to utilize collaboration interface 108-1 (see FIG. 1) or another collaboration interface to provide an intrinsic value function to value determination engine 114 (see FIG. 1).

In step 610, value determination engine 114 (see FIG. 1) determines the intrinsic value of S' by evaluating the intrinsic value function determined in step 608. The Intrinsic_Value function measures the value of schema S', independently from the relationships that schema S' has with ontology schema S1.

The process of FIG. 6 ends at step 612.

Figure 7:
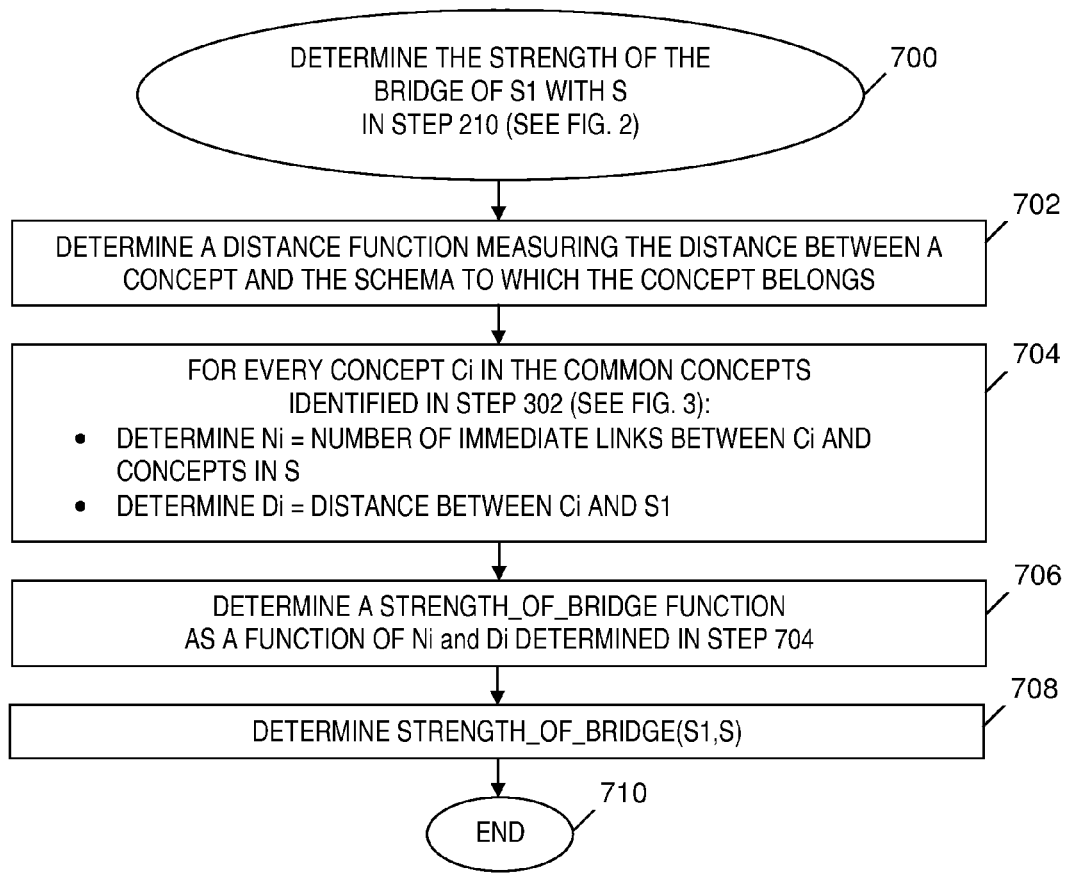
FIG. 7 is a flowchart of a process of determining the strength of the bridge of an ontology schema with a sub-schema extracted in the process of FIG. 2, where the process of determining the strength is included in the process of FIG. 2, in accordance with embodiments of the present invention.

FIG. 7 is a flowchart of a process of determining the strength of the bridge of an ontology schema with a sub-schema extracted in the process of FIG. 2, where the process of determining the strength is included in the process of FIG. 2, in accordance with embodiments of the present invention. In one embodiment, the steps of the process of FIG. 7 are included in step 210 (see FIG. 2).

The strength of a bridge of ontology schema S1 with sub-schema S depends at least on (1) the distance that every shared concept has with the ontology schema S1; and (2) the number of immediate links that the shared concepts have with the non-shared concepts of the imported sub-schema (i.e., sub-schema S). The strength of the bridge of S1 with S is high when the bridge links many immediate concepts from the imported and valuable sub-schema S and when the common concepts joining S1 and S are close to the central concepts of S1, where the central concepts are the concepts in S1 having the highest weight. Therefore, determining the strength of the bridge requires a function that provides a measure of the distance that a concept has with its own schema, as described below. It should be noted that the determination of the strength of the bridge by the process of FIG. 7 does not consider the number of shared concepts to avoid giving too much importance to a bridge where the number of shared concepts is high with respect to the number of non-shared concepts.

The process of FIG. 7 begins at step 700. In step 702, value determination engine 114 (see FIG. 1) determines the function Distance(C,S), which provides a measure of the distance between a concept C and the sub-schema S to which the concept belongs. Distance(C,S) is the shortest distance between concept C and any of the concepts which have the maximum weight in sub-schema S. In one embodiment, by default, value determination engine 114 (see FIG. 1) automatically determines Distance(C,S) to be defined as follows:

Distance(C,S)=1+MIN [distance (C,Ci) |weight(Ci)= MAX(weight(Cn))], where Ci and Cn belong to sub-schema S extracted in step 204 (see FIG. 2). In other words, Distance (C,S) represents the shortest distance between C and any of the concepts that have the maximum weight in sub-schema S.

In one embodiment, value determination engine 114 (see FIG. 1) is adaptable by accepting another default function Distance(C,S), if required. In another embodiment, an end user has an option in step 702 to utilize collaboration interface 108-1 (see FIG. 1) or another collaboration interface to provide value determination engine 114 (see FIG. 1) with the function Distance(C,S).

In one embodiment, by default, value determination engine 114 (see FIG. 1) automatically determines weight(Ci) as defined below:

weight(Ci)=Number_of_immediate_links(Ci)*Number_ of_direct_concepts(Ci), where Number_of_immediate_links (Ci)=number of relationships Ci has with the other concepts, where the relationships are in chains of exactly one link, and where Number_of_direct_concepts(Ci)=number of concepts Cx in relation with Ci, through a chain of links that associates Ci and Cx, such that Distance(Ci,Cx,chain) is either zero or has the lowest possible non-zero value.

In one embodiment, value determination engine 114 (see FIG. 1) is adaptable by accepting another default weight(Ci) function, if required. In another embodiment, an end user utilizes collaboration interface 108-1 (see FIG. 1) or another collaboration interface to provide the weight(Ci) function to value determination engine 114 (see FIG. 1) in step 702.

In one embodiment, by default, value determination engine 114 (see FIG. 1) automatically determines distance(Ci,Cj) to be defined as follows:

distance(Ci,Cj)=MIN(Distance(Ci,Cj,chain)) on all possible chains between Ci and Cj, where Distance(Ci,Cj,chain) =number of links that are in chain and that are between the concepts Ci and Cj, where chain is a chain having Ci and Cj as its terminal concepts.

In one embodiment, Distance(Ci,Cj,chain) is the sum of weighted links along chain, where each weight of a link in chain measures a respective distance between the concepts linked by the link.

In one embodiment, value determination engine 114 (see FIG. 1) is adaptable by accepting another default distance(Ci, Cj) function, if required. In another embodiment, an end user utilizes collaboration interface 108-1 (see FIG. 1) or another collaboration interface to provide the distance(Ci,Cj) function to value determination engine 114 (see FIG. 1).

In step 704, for every concept Ci in the concepts common to ontology schema S1 and sub-schema S, value determination engine 114 (see FIG. 1) (1) determines Ni=the number of immediate links between concept Ci and concepts in sub-schema S extracted in step 204 (see FIGS. 2), and (2) determines Di=Distance(Ci,S1)=the distance between Ci and ontology schema S1.

In step 706, value determination engine 114 (see FIG. 1) determines a Strength_of_bridge function that depends on Ni and Di, which are determined in step 704. In one embodiment, by default, value determination engine 114 (see FIG. 1) in step 706 automatically determines Strength_of_bridge(S1, S)=Σ[Number_of_immediate_links(Cx,S)/Distance(Cx, S1)] for each concept Cx in the set {Cc} identified in step 302 (see FIG. 3), where Number_of_immediate_links(Cx, S)=number of relationships that Cx has with other concepts of S, where each relationship is in a chain having exactly one link, and where Distance(Cx,S1) measures the distance between Cx and ontology schema S1; i.e., measures how close or far Cx is from the central concepts of S1. It should be noted that the lowest possible value of Distance(C,S) is 1, thereby avoiding a division by zero in the evaluation of the Strength_of_bridge function.

In step 708, value determination engine 114 (see FIG. 1) determines the value of Strength_of_bridge(S1,S) by evaluating the Strength_of_bridge function determined in step 706. The value determined in step 708 is the strength of a bridge of ontology schema S1 with sub-schema S.

The process of FIG. 7 ends at step 710.

Figure 8:
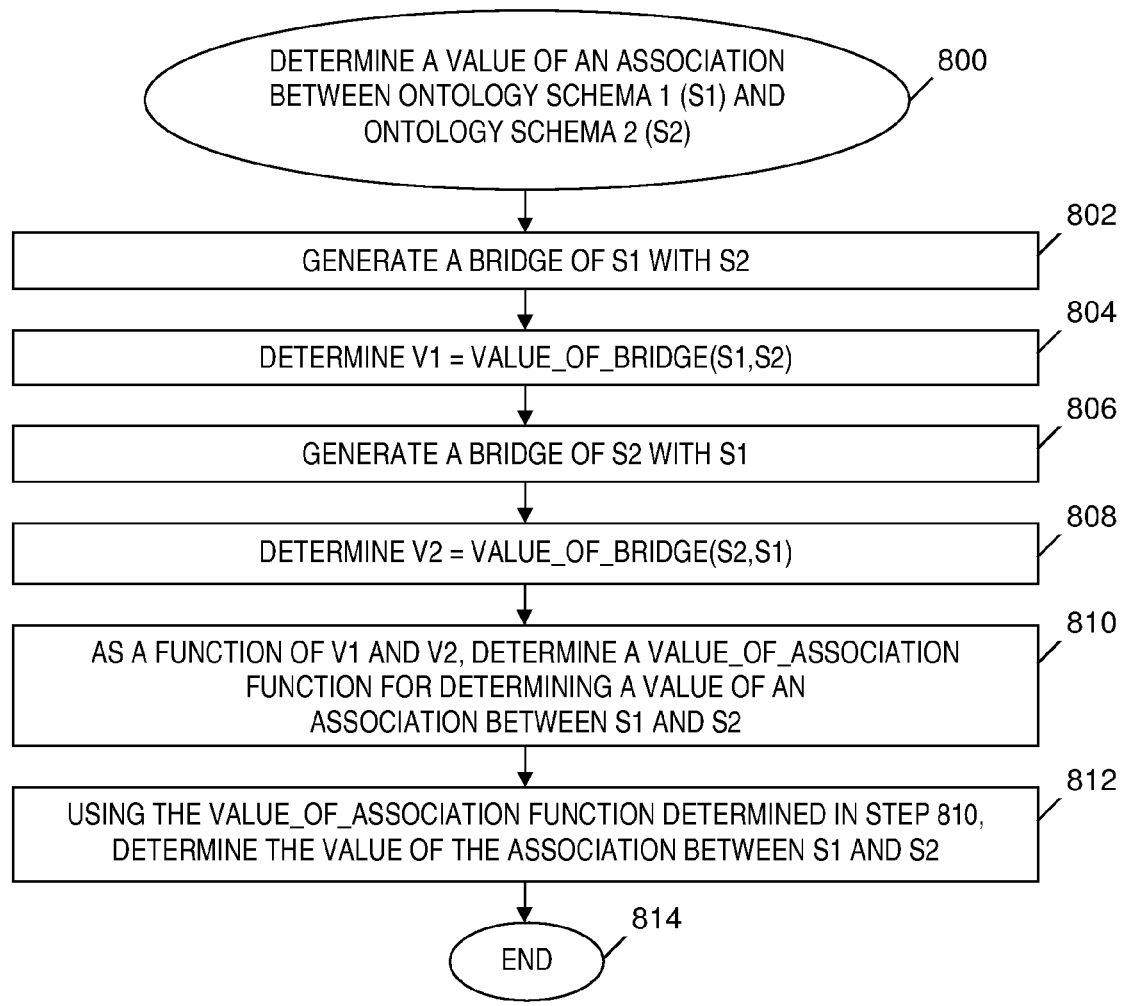
FIG. 8 is a flowchart of a process of determining a value of an association between ontologies, where the value of the association is based on the value of two bridges determined in the process of FIG. 2, in accordance with embodiments of the present invention.

FIG. 8 is a flowchart of a process of determining a value of an association between ontologies, where the value of the association is based on the value of two bridges determined in the process of FIG. 2, in accordance with embodiments of the present invention. When computing the value of the bridge of S1 with S2 using the process of FIG. 2, the computation considers only the valuable concepts imported from S2 into S1. Similarly, when computing the value of the bridge of S2 with S1, the computation considers only the valuable concepts imported from S1 into S2. S2 may bring more (or less) valuable concepts to S1 than S1 brings to S2 and therefore, Value_of_Bridge(S1,S2) does not equal Value_of_Bridge (S2,S1). The process of FIG. 8 determines a value of an association between ontology schemas that does not depend on only a single bridge of one ontology schema with another ontology schema; instead the value of the association is based on a combination of Value_of_Bridge(S1,S2) and Value_of_Bridge(S2,S1).

The process of FIG. 8 begins at step 800. In step 802, association creation engine 112 (see FIG. 1) generates a bridge of ontology schema S1 with ontology schema S2. In one embodiment, performing step 802 includes performing step 202 (see FIG. 2), which includes the steps of FIG. 3, and step 304 in FIG. 3 includes the steps of FIG. 4.

In step 804, value determination engine 114 (see FIG. 1) uses a Value_of_Bridge function to determine V1=Value_of_Bridge(S1,S2), which is the value of the bridge of S1 with S2. In one embodiment, the Value_of_Bridge function used in step 804 is the Value_of_Bridge function identified in step 212. In one embodiment, step 804 includes performing steps 204, 206, 208, 210, 212 and 214 in FIG. 2, where step 206 includes the steps in FIG. 5, step 208 includes the steps of FIG. 6 and step 210 includes the steps of FIG. 7.

In step 806, association creation engine 112 (see FIG. 1) generates a bridge of S2 with S1. In one embodiment, performing step 806 includes performing a step analogous to step 202 (see FIG. 2), which includes the steps analogous to the steps of FIG. 3, and a step analogous to step 304 in FIG. 3 includes steps analogous to the steps of FIG. 4. The analogous steps that perform step 806 are formed by interchanging S1 and S2, so that S1 in the step 202 (see FIG. 2) and in the steps of FIG. 3 and FIG. 4 becomes S2 in step 806, and S2 in step 202 (see FIG. 2) and in the steps of FIG. 3 and FIG. 4 becomes S1 in step 806.

In step 808, value determination engine 114 (see FIG. 1) determines V2=Value_of_Bridge(S2,S1), which is the value of the bridge of ontology schema S2 with ontology schema S1. In one embodiment, performing step 808 includes performing steps analogous to 204, 206, 208, 210, 212 and 214 in FIG. 2, where the step analogous to step 206 (see FIG. 2) includes steps analogous to the steps in FIG. 5, the step analogous to step 208 (see FIG. 2) includes steps analogous to the steps of FIG. 6, and the step analogous to step 210 includes analogous to the steps of FIG. 7. The analogous steps that perform step 808 are formed by interchanging S1 and S2, so that S1 in any of steps 204, 206, 208, 210, 212 and 214, and the steps of FIG. 5, FIG. 6 and FIG. 7 becomes S2 in step 808, and S2 in any of the above-mentioned steps becomes S1 in step 808.

In step 810, value determination engine 114 (see FIG. 1) determines a Value_of_Association function for determining another value of association between ontology schema S1 and ontology schema S2. In one embodiment, value determination engine 114 (see FIG. 1) in step 810 automatically determines a default Value_of_Association function as follows:

Value_of_Association(S1,S2)=Value_of_Bridge(S1,S2)+Value_of_Bridge(S2,S1)

The value determination engine 114 (see FIG. 1) may be adaptable by accepting another default Value_of_Association function, if required. In another embodiment, an end user utilizes collaboration interface 108-1 (see FIG. 1) or another collaboration interface to provide value determination engine 114 (see FIG. 1) with a Value_of_Association function in step 810.

In step 812, using the Value_of_Association function determined in step 810, value determination engine 114 (see FIG. 1) determines the value of association between S1 and S2 (i.e., by evaluating Value_of_Association(S1,S2)).

The process of FIG. 8 ends at step 814.

In one embodiment, the process of FIG. 8 may be repeated to determine multiple values of associations between ontology schemas. For example, the process of FIG. 8 may be repeated to determine values of associations among four ontology schemas, S1, S2, S3 and S4, thereby determining the following six values of associations between: S1 and S2, S1 and S3, S1 and S4, S2 and S3, S2 and S4, and S3 and S4. Based on the multiple values of associations between ontology schemas, value determination engine 114 (see FIG. 1) ranks the associations between ontology schemas. Based on the ranking of the associations, an end user may focus by priority only on the ontology schemas whose associations have the highest ranks, and avoid considering associations that have the lowest ranks, which include the associations that have no value.

Example

The example in this section depicts the steps of creating a bridge and computing the value of a bridge.

Figure 9A:
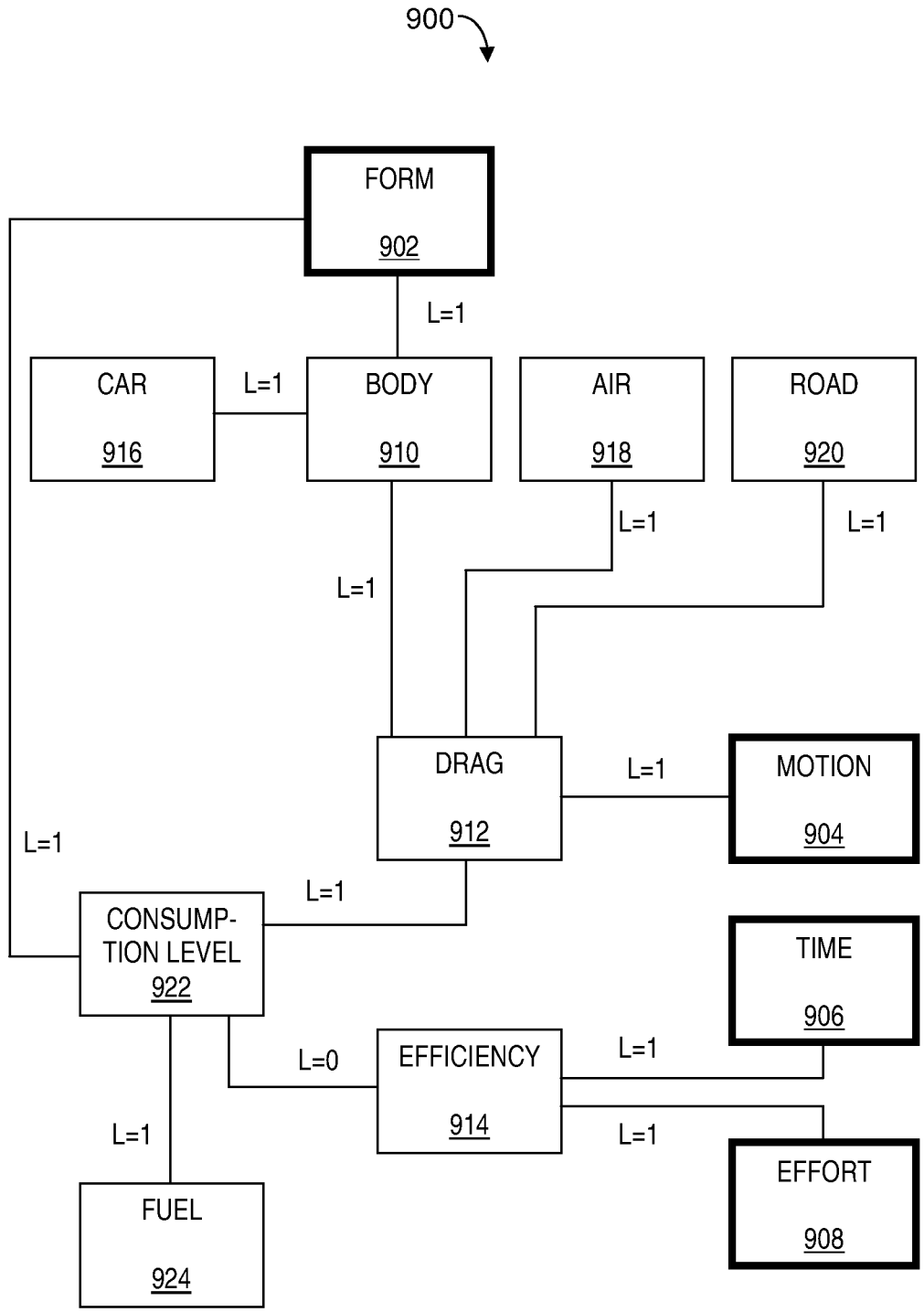
FIGS. 9A-9B are diagrams of exemplary first and second schemas, respectively, used to generate a bridge of the first schema with the second schema in the process of FIG. 2, in accordance with embodiments of the present invention.
Figure 9B:
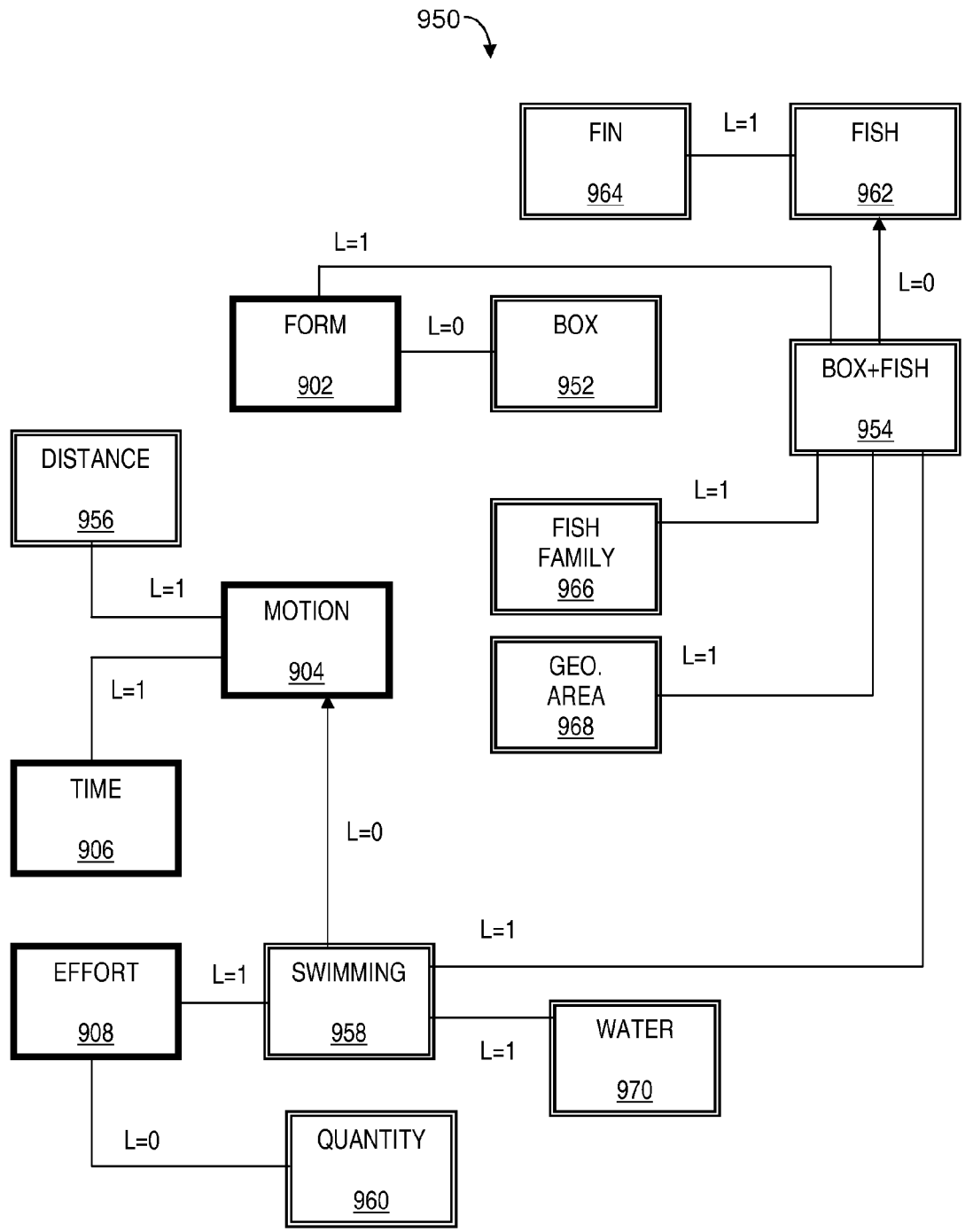

Creation of a Bridge: FIGS. 9A-9B are diagrams of exemplary first and second schemas, respectively, used to generate a bridge of the first schema with the second schema in the process of FIG. 2, in accordance with embodiments of the present invention. The schemas in FIGS. 9A and 9B are based on different knowledge domains. Although the probability of finding common concepts between such schemas may be low, building a bridge of the first schema with the second schema may provide innovative ideas. Schema 900 in FIG. 9A describes car efficiency and includes the following concepts: form 902, motion 904, time 906, effort 908, body 910, drag 912, efficiency 914, car 916, air 918, road 920, consumption level 922 and fuel 924. In this section, schema 900 is also referred to as Schema1 or Schema 1. Schema 950 in FIG. 9B describes marine fish and includes the following concepts: form 902, motion 904, time 906, effort 908, box 952, box+fish 954, distance 956, swimming 958, quantity 960, fish 962, fin 964, fish family 966, geographic area 968, and water 970. In this section, schema 950 is also referred to as Schema2 or Schema 2. The concepts with the thick single border (i.e., form 902, motion 904, time 906 and effort 908) are the concepts that Schema 1 and Schema 2 have in common. That is the set of common concepts is the set of form 902, motion 904, time 906 and effort 908.

Using step 202 (see FIG. 2), and the steps of FIG. 3 and FIG. 4, Bridge(Schema1, Schema2) and Bridge(Schema2, Schema1) are generated in this example. A length of 0 (i.e., L=0) is assigned to the relationships in FIGS. 9A and 9B that very strongly link the concepts, including some standard relationships identified when building the semantic schema. In the case of the method described in U.S. patent application Ser. No. 13/432,120 entitled "BUILDING AN ONTOLOGY BY TRANSFORMING COMPLEX TRIPLES," relationships that very strongly link concepts include the following relationships: "is_a", "has_attribute", "has_property", and "has_value". For example, the relationship between efficiency 914 and consumption level 922 in FIG. 9A is a "has_property" relationship; therefore, a length of 0 is assigned to the relationship (see the L=0 indicator by the line joining consumption level 922 and efficiency 914 in FIG. 9A). Other assignments of a zero length in FIG. 9B include the "has_attribute" relationship between effort 908 and quantity 960; the "is_a" relationship between swimming 958 and motion 904; the "has_value" relationship between box 952 and form 902; and the "is_a" relationship between box+fish 954 and fish 962. The other links in FIGS. 9A and 9B have by default a length=1 (see the L=1 indicator by the lines joining the other concepts in FIGS. 9A and 9B).

Tables 1-10 presented below include the calculations used in step 408 (see FIG. 4) to identify significant concepts in Schema 1 and in Schema 2 in step 304 (see FIG. 3). It should be noted that in Tables 1-4 and 6-9, (1) $S(C_i)$ is the strength $(C_i)$ function; (2) Lengths of_paths $(C_i, C_c)$ is the length (chain) function; and (3) B is the evaluation of the bond_strength function, where the strength$(C_i)$ function, the length (chain) function and the bond_strength function are discussed above relative to FIG. 4.

Table 1 presented below includes the calculations that determine the significance of concepts $C_i$ in Schema 1 with respect to the common concept Form 902 (see FIG. 9A; a.k.a. FORM) by evaluating significance($C_i$,FORM).

TABLE 1

| Concept $C_i$ | $A = S(C_i)$ | Lengths_of_paths $(C_i, C_c)$ | $B = \Sigma[1/(1 + \text{Lengths\_of\_paths})]$ | Significance $(C_i, \text{FORM}) = A * B$ |
|---|---|---|---|---|
| \multicolumn{5}{c}{COMMON CONCEPT = $C_c$ = FORM} |
| CAR | 1 | 2;4 | 8/15 | 8/15 |
| BODY | 3 | 1;3 | 3/4 | 9/4 |
| AIR | 1 | 3;3 | 1/2 | 1/2 |
| ROAD | 1 | 3;3 | 1/2 | 1/2 |
| DRAG | 5 | 2;2 | 2/3 | 10/3 |
| CONSUMPTION LEVEL | 6 | 1;3 | 3/4 | 9/2 |
| FUEL | 2 | 2;4 | 8/15 | 16/15 |
| EFFICIENCY | 6 | 1;3 | 3/4 | 9/2 |

Table 2 presented below includes the calculations that determine the significance of concepts $C_i$ in Schema 1 with respect to the common concept Motion 904 (see FIG. 9A; a.k.a. MOTION) by evaluating significance($C_i$,MOTION).

TABLE 2

COMMON CONCEPT = $C_c$ = MOTION

| Concept $C_i$ | $A = S(C_i)$ | Lengths_of_paths $(C_i, C_c)$ | $B = \Sigma[1/(1 + \text{Lengths\_of\_paths})]$ | Significance($C_i$, MOTION) = A * B |
|---|---|---|---|---|
| CAR | 1 | 4 | 1/4 | 1/4 |
| BODY | 3 | 2 | 1/3 | 1 |
| AIR | 1 | 2 | 1/3 | 1/3 |
| ROAD | 1 | 2 | 1/3 | 1/3 |
| DRAG | 5 | 1 | 1/2 | 5/2 |
| CONSUMPTION LEVEL | 6 | 2 | 1/3 | 2 |
| FUEL | 2 | 3 | 1/4 | 1/2 |
| EFFICIENCY | 6 | 2 | 1/3 | 2 |

Table 3 presented below includes the calculations that determine the significance of concepts $C_i$ in Schema 1 with respect to the common concept Time 906 (see FIG. 9A; a.k.a. TIME) by evaluating significance($C_i$,TIME).

TABLE 3

COMMON CONCEPT = $C_c$ = TIME

| Concept $C_i$ | $A = S(C_i)$ | Lengths_of_paths $(C_i, C_c)$ | $B = \Sigma[1/(1 + \text{Lengths\_of\_paths})]$ | Significance $(C_i, \text{TIME}) = A * B$ |
|---|---|---|---|---|
| CAR | 1 | 4 | 1/5 | 1/5 |
| BODY | 3 | 3 | 1/4 | 3/4 |
| AIR | 1 | 3 | 1/4 | 1/4 |
| ROAD | 1 | 3 | 1/4 | 1/4 |
| DRAG | 5 | 2 | 1/3 | 5/3 |

TABLE 3-continued

| | | COMMON CONCEPT = Cc = TIME | | |
|---|---|---|---|---|
| Concept Ci | A = S(Ci) | Lengths_of_paths (Ci, Cc) | B = Σ[1/(1 + Lengths_of_paths)] | Significance (Ci, TIME) = A * B |
| CONSUMPTION LEVEL | 6 | 1 | 1/2 | 3 |
| FUEL | 2 | 2 | 1/3 | 2/3 |
| EFFICIENCY | 6 | 1 | 1/2 | 3 |

Table 4 presented below includes the calculations that determine the significance of concepts Ci in Schema 1 with respect to the common concept Effort 908 (see FIG. 9A; a.k.a. EFFORT) by evaluating significance(Ci,EFFORT).

TABLE 4

| | | COMMON CONCEPT = Cc = EFFORT | | |
|---|---|---|---|---|
| Concept Ci | A = S(Ci) | Lengths_of_paths (Ci, Cc) | B = Σ[1/(1 + Lengths_of_paths)] | Significance(Ci, EFFORT) = A * B |
| CAR | 1 | 4 | 1/5 | 1/5 |
| BODY | 3 | 3 | 1/4 | 3/4 |
| AIR | 1 | 3 | 1/4 | 1/4 |
| ROAD | 1 | 3 | 1/4 | 1/4 |
| DRAG | 5 | 2 | 1/3 | 5/3 |
| CONSUMPTION LEVEL | 6 | 1 | 1/2 | 3 |
| FUEL | 2 | 2 | 1/3 | 2/3 |
| EFFICIENCY | 6 | 1 | 1/2 | 3 |

Table 5 presented below summarizes the significance calculations in Tables 1-4, and includes a computation of significance(Ci) included in step 408 (see FIG. 4).

TABLE 5

| | SIGNIFICANCE WITH RESPECT TO COMMON CONCEPT | | | | SIGNIFI- |
|---|---|---|---|---|---|
| Concept Ci | FORM | MOTION | TIME | EFFORT | CANCE |
| CAR | 8/15 | 1/4 | 1/5 | 1/5 | 59/60 = 0.98 |
| BODY | 9/4 | 1 | 3/4 | 3/4 | 19/4 = 4.75 |
| AIR | 1/2 | 1/3 | 1/4 | 1/4 | 4/3 = 1.33 |
| ROAD | 1/2 | 1/3 | 1/4 | 1/4 | 4/3 = 1.33 |
| DRAG | 10/3 | 5/2 | 5/3 | 5/3 | 55/6 = 9.17 |
| CONSUMPTION LEVEL | 9/2 | 2 | 3 | 3 | 25/2 = 12.5 |
| FUEL | 16/15 | 1/2 | 2/3 | 2/3 | 29/10 = 2.9 |
| EFFICIENCY | 9/2 | 2 | 3 | 3 | 25/2 = 12.5 |

Table 6 presented below includes the calculations that determine the significance of concepts Ci in Schema 2 with respect to the common concept Form 902 (see FIG. 9B; a.k.a. FORM) by evaluating significance(Ci,FORM).

TABLE 6

| | | COMMON CONCEPT = Cc = FORM | | |
|---|---|---|---|---|
| Concept Ci | A = S(Ci) | Lengths_of_paths (Ci, Cc) | B = Σ[1/(1 + Lengths_of_paths)] | Significance (Ci, FORM) = A * B |
| FIN | 2 | 2 | 1/3 | 2/3 |
| FISH | 8 | 1 | 1/2 | 4 |
| BOX FISH | 8 | 1 | 1/2 | 4 |
| BOX | 2 | 0 | 1 | 2 |
| FISH FAMILY | 2 | 2 | 1/3 | 2/3 |
| GEO AREA | 2 | 2 | 1/3 | 2/3 |
| DISTANCE | 2 | 3 | 1/4 | 1/2 |
| SWIMMING | 8 | 2 | 1/3 | 8/3 |
| QUANTITY | 3 | 3 | 1/4 | 3/4 |
| WATER | 2 | 3 | 1/4 | 1/2 |

Table 7 presented below includes the calculations that determine the significance of concepts Ci in Schema 2 with respect to the common concept Motion 904 (see FIG. 9B; a.k.a. MOTION) by evaluating significance(Ci,MOTION).

TABLE 7

| | COMMON CONCEPT = Cc = MOTION | | | |
|---|---|---|---|---|
| Concept Ci | A = S(Ci) | Lengths_of_paths (Ci, Cc) | B = Σ[1/(1 + Lengths_of_paths)] | Significance(Ci, MOTION) = A * B |
| FIN | 2 | 2 | 1/3 | 2/3 |
| FISH | 8 | 1 | 1/2 | 4 |
| BOX FISH | 8 | 1 | 1/2 | 4 |
| BOX | 2 | 2 | 1/3 | 2/3 |
| FISH FAMILY | 2 | 2 | 1/3 | 2/3 |
| GEO AREA | 2 | 2 | 1/3 | 2/3 |
| DISTANCE | 2 | 1 | 1/2 | 1 |
| SWIMMING | 8 | 0 | 1 | 8 |
| QUANTITY | 3 | 1 | 1/2 | 3/2 |
| WATER | 2 | 1 | 1/2 | 1 |

Table 8 presented below includes the calculations that determine the significance of concepts Ci in Schema 2 with respect to the common concept Time 906 (see FIG. 9B; a.k.a. TIME) by evaluating significance(Ci,TIME).

TABLE 8

| | COMMON CONCEPT = Cc = TIME | | | |
|---|---|---|---|---|
| Concept Ci | A = S(Ci) | Lengths_of_paths (Ci, Cc) | B = Σ[1/(1 + Lengths_of_paths)] | Significance (Ci, TIME) = A * B |
| FIN | 2 | 3 | 1/4 | 1/2 |
| FISH | 8 | 2 | 1/3 | 8/3 |
| BOX FISH | 8 | 2 | 1/3 | 8/3 |
| BOX | 2 | 3 | 1/4 | 1/2 |
| FISH FAMILY | 2 | 3 | 1/4 | 1/2 |
| GEO AREA | 2 | 3 | 1/4 | 1/2 |
| DISTANCE | 2 | 2 | 1/3 | 2/3 |
| SWIMMING | 8 | 1 | 1/2 | 4 |
| QUANTITY | 3 | 2 | 1/3 | 1 |
| WATER | 2 | 2 | 1/3 | 2/3 |

Table 9 presented below includes the calculations that determine the significance of concepts Ci in Schema 2 with respect to the common concept Effort 908 (see FIG. 9B; a.k.a. EFFORT) by evaluating significance(Ci,EFFORT).

TABLE 9

| | COMMON CONCEPT = Cc = EFFORT | | | |
|---|---|---|---|---|
| Concept Ci | A = S(Ci) | Lengths_of_paths (Ci, Cc) | B = Σ[1/(1 + Lengths_of_paths)] | Significance(Ci, EFFORT) = A * B |
| FIN | 2 | 3 | 1/4 | 1/2 |
| FISH | 8 | 2 | 1/3 | 8/3 |
| BOX FISH | 8 | 2 | 1/3 | 8/3 |
| BOX | 2 | 3 | 1/4 | 1/2 |
| FISH FAMILY | 2 | 3 | 1/4 | 1/2 |
| GEO AREA | 2 | 3 | 1/4 | 1/2 |
| DISTANCE | 2 | 2 | 1/3 | 2/3 |
| SWIMMING | 8 | 1 | 1/2 | 4 |
| QUANTITY | 3 | 0 | 1 | 3 |
| WATER | 2 | 2 | 1/3 | 2/3 |

Table 10 presented below summarizes the significance calculations in Tables 6-9, and includes a computation of significance(Ci), which is included in step 408 (see FIG. 4).

TABLE 10

| Concept Ci | SIGNIFICANCE WITH RESPECT TO COMMON CONCEPT | | | | SIGNIFI-CANCE |
|---|---|---|---|---|---|
| | FORM | MOTION | TIME | EFFORT | |
| FIN | 2/3 | 2/3 | 1/2 | 1/2 | 14/6 = 2.33 |
| FISH | 4 | 4 | 8/3 | 8/3 | 40/3 = 13.33 |
| BOX FISH | 4 | 4 | 8/3 | 8/3 | 40/3 = 13.33 |
| BOX | 2 | 2/3 | 1/2 | 1/2 | 10/3 = 3.33 |
| FISH FAMILY | 2/3 | 2/3 | 1/2 | 1/2 | 7/3 = 2.33 |
| GEO AREA | 2/3 | 2/3 | 1/2 | 1/2 | 7/3 = 2.33 |
| DISTANCE | 1/2 | 1 | 2/3 | 2/3 | 17/3 = 5.66 |
| SWIMMING | 8/3 | 8 | 4 | 4 | 56/3 = 18.66 |
| QUANTITY | 3/4 | 3/2 | 1 | 3 | 25/4 = 6.25 |
| WATER | 1/2 | 1 | 2/3 | 2/3 | 17/3 = 5.66 |

In this example, the significance threshold is set to 3. Based on the calculations in Tables 1-10 presented above, step 202 (see FIG. 2) generates the following bridges: Bridge(Schema1,Schema2) and Bridge(Schema2,Schema1).

Figure 10:
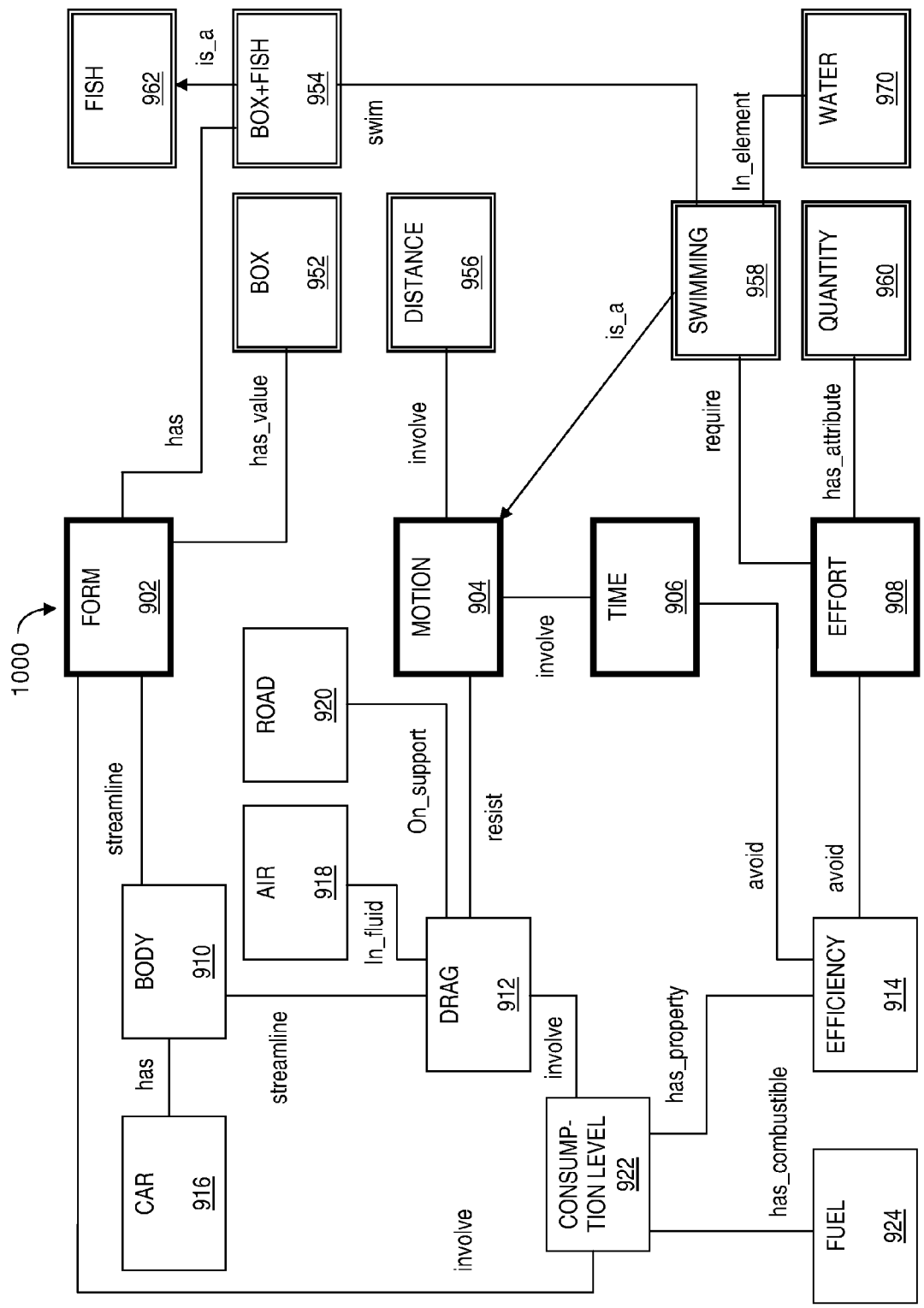
FIG. 10 is a diagram of an exemplary bridge of the first schema with the second schema, where the diagram of the first schema is in FIG. 9A and the diagram of the second schema is in FIG. 9B, in accordance with embodiments of the present invention.

Bridge(Schema1,Schema2) is depicted as a bridge 1000 in FIG. 10, and includes the following concepts: form 902, motion 904, time 906, effort 908, body 910, drag 912, efficiency 914, car 916, air 918, road 920, consumption level 922, fuel 924, box 952, box+fish 954, distance 956, swimming 958, quantity 960, fish 962 and water 970.

Figure 11:
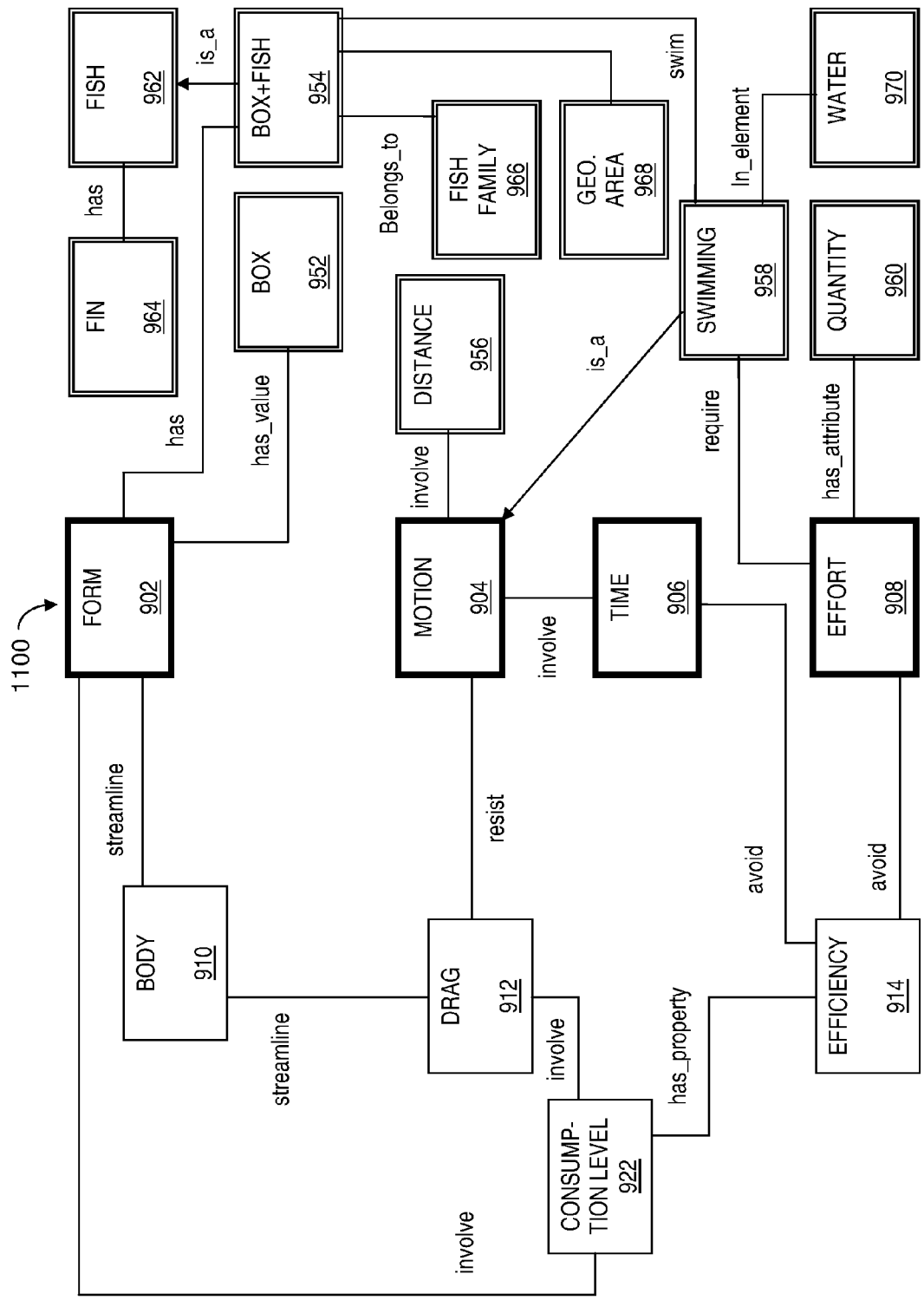
FIG. 11 is a diagram of an exemplary bridge of the second schema with the first schema, where the diagram of the first schema is in FIG. 9A and the diagram of the second schema is in FIG. 9B, in accordance with embodiments of the present invention.

Bridge(Schema2,Schema1) is depicted as a bridge 1100 in FIG. 11, and includes the following concepts: form 902, motion 904, time 906, effort 908, body 910, drag 912, efficiency 914, consumption level 922, box 952, box+fish 954, distance 956, swimming 958, quantity 960, fish 962, fin 964, fish family 966, geographic area 968 and water 970.

Figure 12:
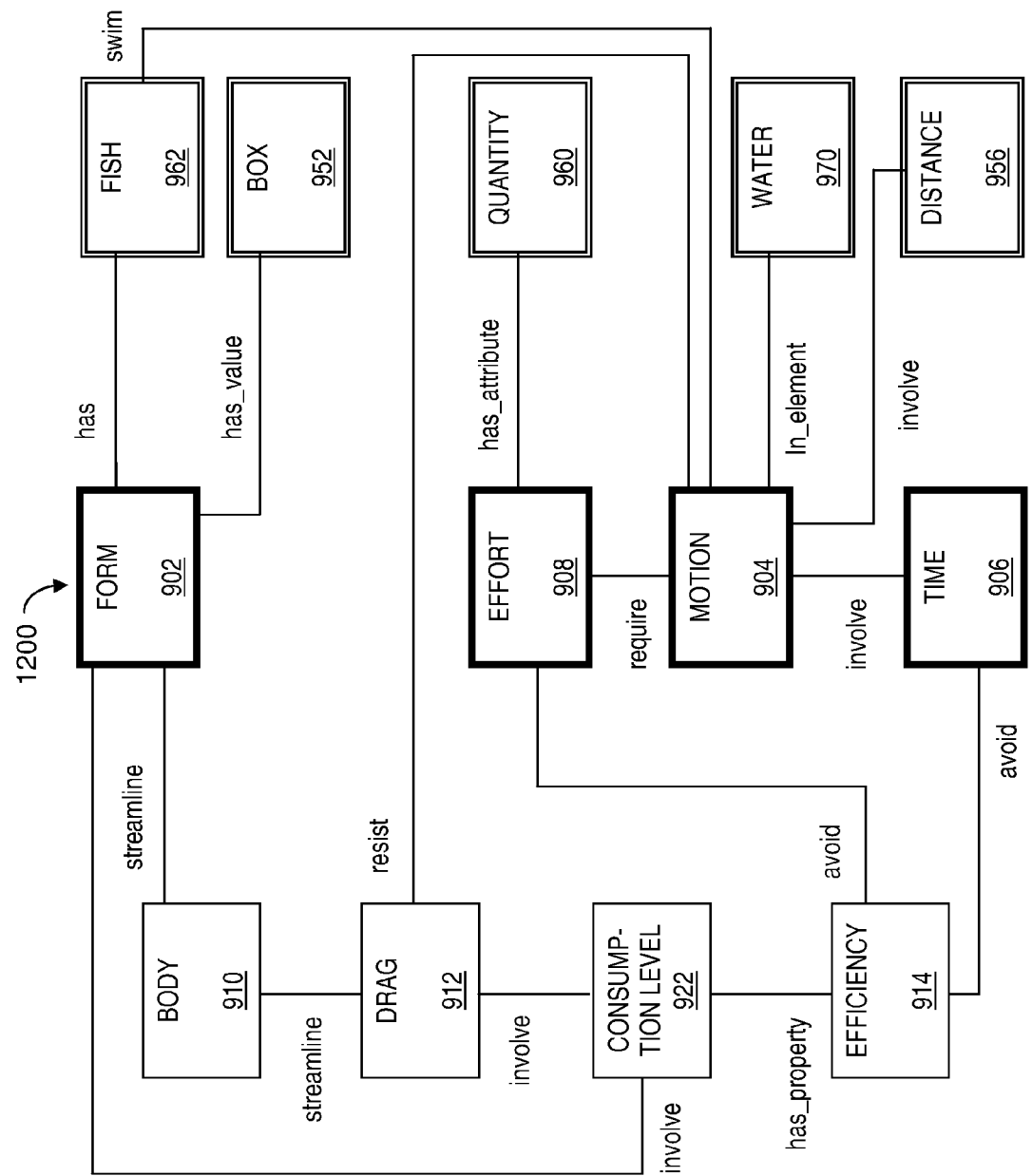
FIG. 12 is a diagram of an intersection of the bridges in FIG. 10 and FIG. 11, with sub-classes removed, in accordance with embodiments of the present invention.

FIG. 12 is a diagram of an intersection of the bridges in FIG. 10 and FIG. 11, with sub-classes removed, in accordance with embodiments of the present invention. An intersection 1200 is the combination (i.e., intersection) of bridge 1000 (see FIG. 10) and bridge 1100 (see FIG. 11), with a removal of the following sub-classes: box+fish 954 (see FIGS. 10 and 11; sub-class of fish 962 (see FIGS. 10 and 11)) and swimming 958 (see FIGS. 10 and 11; sub-class of motion 904 (see FIGS. 10 and 11)). Intersection 1200 includes the concepts relevant to both Schema 1 and Schema 2.

Computation of the Value of a Bridge: Using the steps 204-214 in FIG. 2, the first value of a bridge computed in this example is the value of the Bridge(Schema1,Schema2).

Figure 13A:
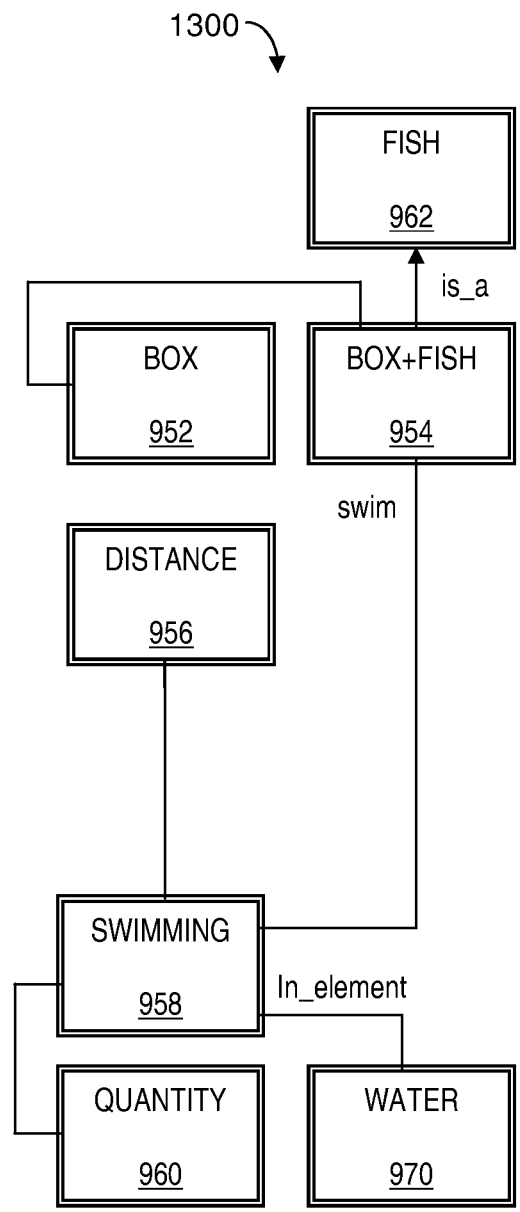
FIG. 13A is a diagram of an exemplary schema created by the process of FIG. 5 that modifies a sub-schema of the second schema that was imported into the first schema to generate the bridge of the first schema with the second schema, in accordance with embodiments of the present invention.

Schema 1300 in FIG. 13A is a diagram of an exemplary schema created by the process of FIG. 5 that modifies a sub-schema of the second schema that was imported into the first schema to generate the bridge of the first schema with the second schema, in accordance with embodiments of the present invention. In this example, the first schema is Schema 1 and the second schema is Schema 2.

Schema 1300 in FIG. 13A (i.e., schema S' in the discussion relative to FIGS. 13A and 13B) is created by step 206 (see FIG. 2) and the steps in FIG. 5. Schema 1300 includes box 952, box+fish 954, distance 956, swimming 958, quantity 960, fish 962 and water 970. Step 502 (see FIG. 5) creates an initial version of S' to be sub-schema S (see sub-schema 1350 in FIG. 13B). Step 504 (see FIG. 5) removes the following common concepts from the initial version of S': form 902, motion 904, time 906 and effort 908 (see FIG. 13B). Step 506 (see FIG. 5) identifies the immediate links between box+fish 954 and form 902 (see FIG. 13B) and between box 952 and form 902 (see FIG. 13B), and therefore creates an immediate link in schema 1300 between box+fish 954 and box 952 in FIG. 13A. In similar fashion, step 506 (see FIG. 5) creates the immediate links in schema 1300: between swimming 958 and distance 956 (see FIG. 13A), and between swimming 958 and quantity 960 (see FIG. 13A).

Step 208 and the steps of FIG. 6 determine the intrinsic value of schema 1300 (see FIG. 13A). Step 602 (see FIG. 6) determines n=7 (i.e., the number of concepts in schema 1300 in FIG. 13A). Step 606 (see FIG. 6) includes determining the number of possible links between the n concepts in schema 1300 (see FIG. 13A) to be n*(n−1)/2 (i.e., 7*6/2=21), determining the number of immediate links in schema 1300 (see FIG. 13A) to be 6, and determining the compactness of schema 1300 (see FIG. 13A) to be (number of immediate links in schema 1300 in FIG. 13A)/number of possible links between the n concepts in schema 1300 in FIG. 13A)=6/21=0.29. Step 610 (see FIG. 6) includes determining the intrinsic value of schema 1300 (see FIG. 13A) as follows: Intrinsic value of schema 1300 (see FIG. 13A)= n*compactness of schema 1300 (see FIG. 13A)=7*0.29=2.03.

Figure 13B:
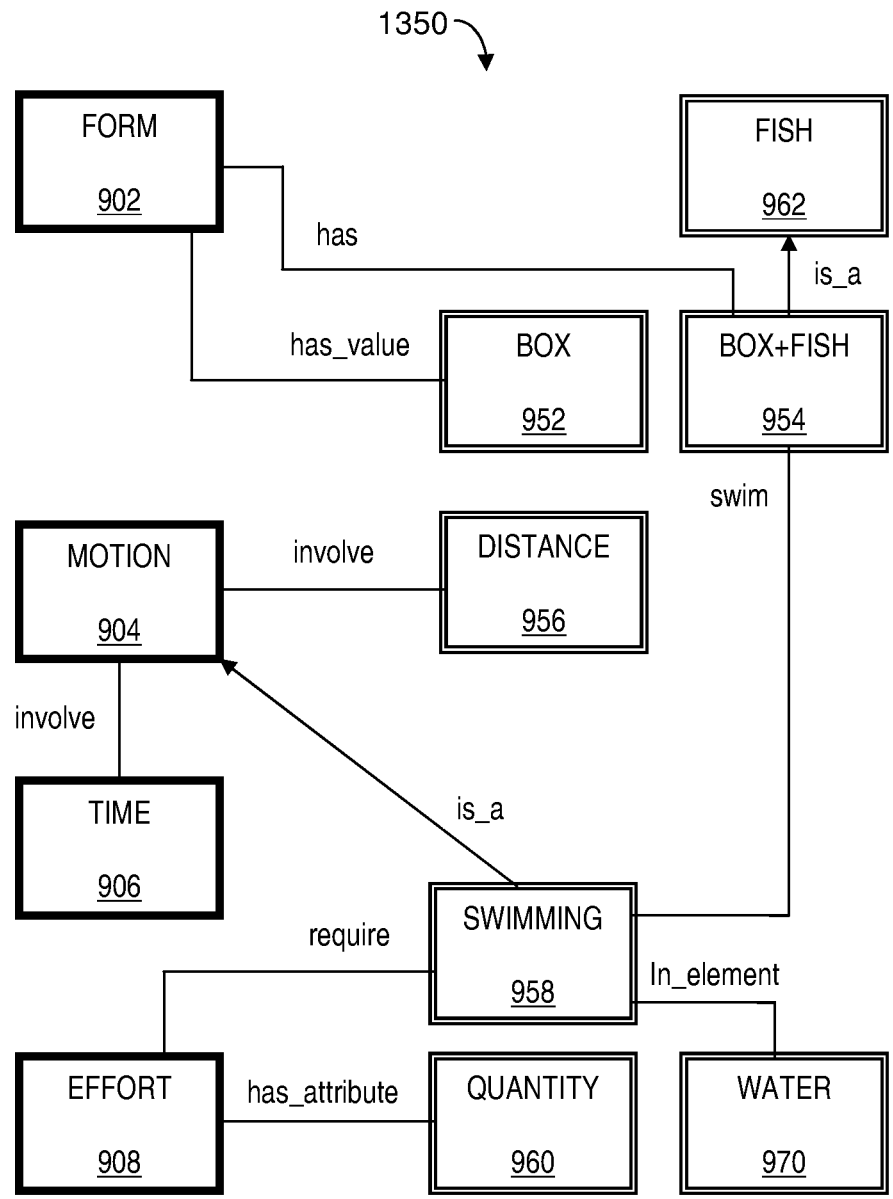
FIG. 13B is a diagram of an exemplary sub-schema that is modified to create the schema in FIG. 13A, in accordance with embodiments of the present invention.

Step 210 and the steps of FIG. 7 determine the strength of Bridge(S1,S), where S1 is Schema 1 and where S is sub-schema 1350 (see FIG. 13B). Sub-schema 1350 (see FIG. 13B) includes form 902, motion 904, time 906, effort 908, box 952, box+fish 954, distance 956, swimming 958, quantity 960, fish 962 and water 970. Sub-schema 1350 (see FIG. 13B) is extracted in step 204 (see FIG. 2) from Bridge(Schema1, Schema2) generated in step 202 (see FIG. 2).

Step 704 (see FIG. 7) determines a distance between each common concept (i.e., form 902, motion 904, time 906 and effort 908 in FIG. 13B) and Schema 1 (i.e., schema 900 in FIG. 9A). Calculations of the distances between each common concept and the concepts having the highest weight in Schema 1 (i.e., DRAG 912 in FIG. 9A, where weight (DRAG)=Number_of_immediate_links(DRAG)*Number_of_direct_concepts(DRAG)=5*6=30) are included in Table 11 presented below.

TABLE 11

| Cc = Common Concept | A = Distance(Cc, DRAG) | Distance(Cc, Schema1) = 1 + A |
|---|---|---|
| FORM | 2 | 3 |
| MOTION | 1 | 2 |
| TIME | 2 | 3 |
| EFFORT | 2 | 3 |

Step 704 (see FIG. 7) also includes calculating the number of immediate links each common concept has with sub-schema 1350 (see FIG. 13B) (i.e., the sub-schema that is imported in step 308 (see FIG. 3) and that is modified to create schema 1300 (see FIG. 13A) in step 206 (see FIG. 2)). Table 12 presented below includes the number of immediate links each common concept has with sub-schema 1350 (see FIG. 13B).

TABLE 12

| Cc = Common Concept | Number of immediate links in the imported sub-schema |
|---|---|
| FORM | 2 |
| MOTION | 3 |
| TIME | 1 |
| EFFORT | 2 |

Step 708 (see FIG. 7) calculates the strength of the bridge of Schema 1 with sub-schema 1350 (see FIG. 13B) as follows: Strength_of_bridge(Schema1,imported sub-schema)= the summation over all shared concepts [number of immediate links from the imported sub-schema to the shared concept/ distance of the shared concept to Schema 1]. The strength of bridge calculations in step 708 are included in Table 13, which is presented below.

TABLE 13

| Cc = Common Concept | A = Distance(Cc, Schema1) | B = Number of immediate links in the imported sub-schema | B/A | Strength of the bridge |
|---|---|---|---|---|
| FORM | 3 | 2 | 2/3 | 19/6 = 3.17 |
| MOTION | 2 | 3 | 3/2 | |
| TIME | 3 | 1 | 1/3 | |
| EFFORT | 3 | 2 | 2/3 | |

Step 214 (see FIG. 2) determines the value of Bridge (Schema1, Schema2) as follows: Value_of_Bridge (Schema1, Schema2)=Intrinsic value of schema 1300 (see FIG. 13A)*Strength_of_bridge (Schema1, imported sub-schema)=2.03*3.17=6.43.

Using the steps 204-214 in FIG. 2, the second value of a bridge computed in this example is the value of Bridge (Schema2,Schema1).

Figure 14A:
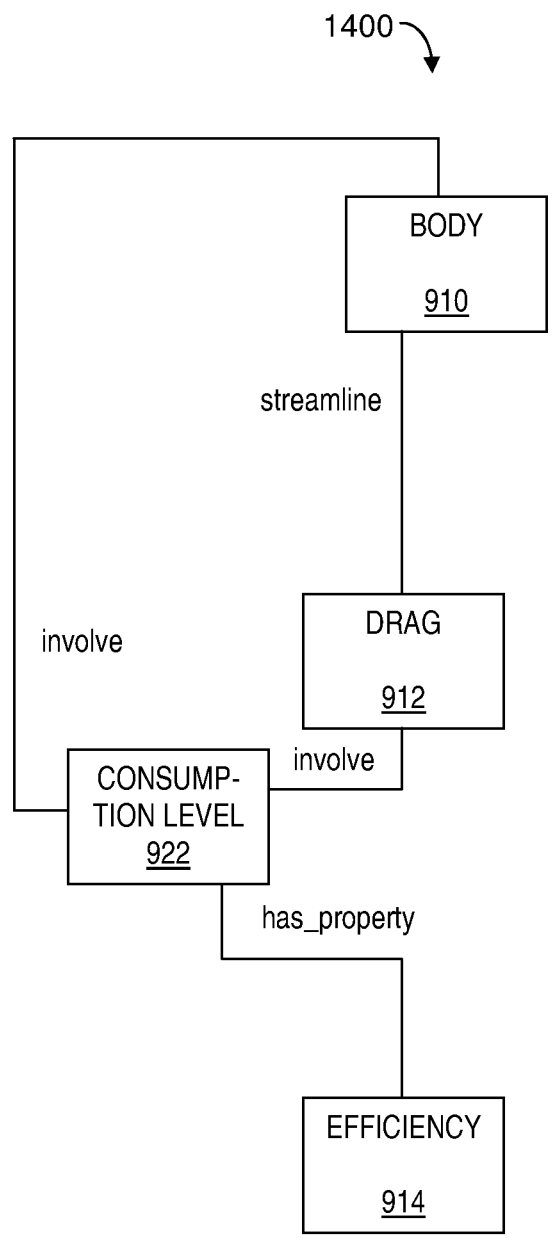
FIG. 14A is a diagram of an exemplary schema created by the process of FIG. 5 that modifies a sub-schema of the first schema that was imported into the second schema to generate the bridge of the second schema with the first schema, in accordance with embodiments of the present invention.

Schema 1400 in FIG. 14A is a diagram of an exemplary schema created by the process of FIG. 5 that modifies a sub-schema of the first schema that was imported into the second schema to generate the bridge of the second schema with the first schema, in accordance with embodiments of the present invention.

Schema 1400 in FIG. 14A (i.e., schema S' in the discussion relative to FIGS. 14A and 14B) is created by step 206 (see FIG. 2) and the steps in FIG. 5. Schema 1400 includes body 910, drag 912, efficiency 914 and consumption level 922. Step 502 (see FIG. 5) creates an initial version of S' to be sub-schema S (see sub-schema 1450 in FIG. 14B). Step 504 (see FIG. 5) removes the following common concepts from the initial version of S': form 902, motion 904, time 906 and effort 908 (see FIG. 14B). Step 506 (see FIG. 5) identifies the immediate links between body 910 and form 902 (see FIG. 14B) and between consumption level 922 and form 902 (see FIG. 14B), and therefore creates an immediate link in schema 1400 between body 910 and consumption level 922 in FIG. 14A.

Step 208 and the steps of FIG. 6 determine the intrinsic value of schema 1400 (see FIG. 14A). Step 602 (see FIG. 6) determines n=4 (i.e., the number of concepts in schema 1400 in FIG. 14A). Step 606 (see FIG. 6) includes determining the number of possible links between the n concepts in schema 1400 (see FIG. 14A) to be n*(n−1)/2 (i.e., 4*3/2=6), determining the number of immediate links in schema 1400 (see FIG. 14A) to be 4, and determining the compactness of schema 1400 (see FIG. 14A) to be (number of immediate links in schema 1400 in FIG. 14A)/number of possible links between the n concepts in schema 1400 in FIG. 14A)=4/6=0.67. Step 610 (see FIG. 6) includes determining the intrinsic value of schema 1400 (see FIG. 14A) as follows: Intrinsic value of schema 1400 (see FIG. 14A)=n*compactness of schema 1400 (see FIG. 14A)=4*0.67=2.68.

Figure 14B:
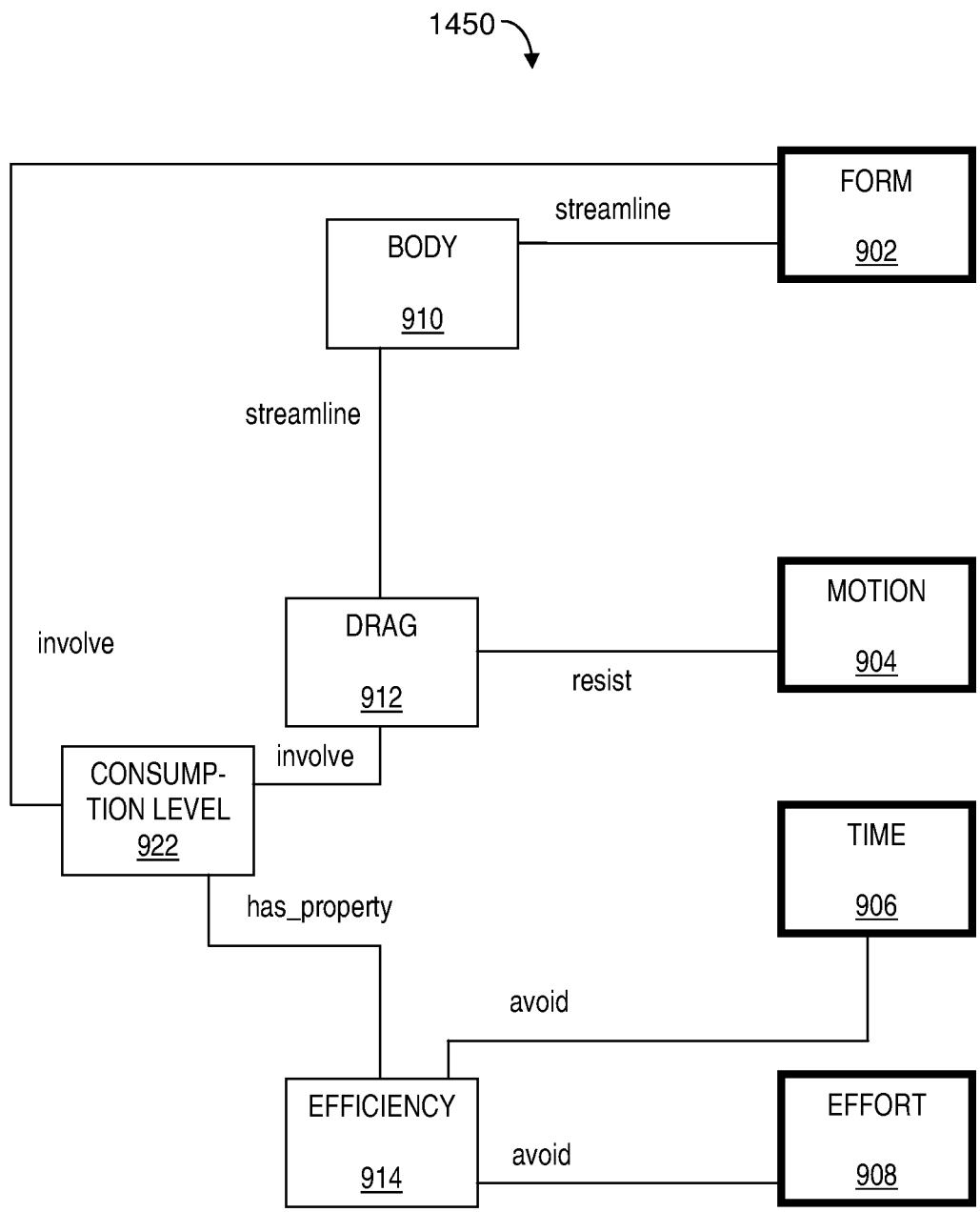
FIG. 14B is a diagram of an exemplary sub-schema that is modified to create the schema in FIG. 14A, in accordance with embodiments of the present invention.

Step 210 and the steps of FIG. 7 determine the strength of Bridge(S2,S), where S2 is Schema 2 and where S is sub-schema 1450 (see FIG. 14B). Sub-schema 1450 (see FIG. 14B) includes form 902, motion 904, time 906, effort 908, body 910, drag 912, efficiency 914 and consumption level 922. Sub-schema 1450 (see FIG. 14B) is extracted in step 204 (see FIG. 2) from Bridge(Schema2,Schema1) generated in step 202 (see FIG. 2).

Step 704 (see FIG. 7) determines a distance between each common concept (i.e., form 902, motion 904, time 906 and effort 908 in FIG. 14B) and Schema 2 (i.e., schema 950 in FIG. 9B). Calculations of the distances between each common concept and the concepts having the highest weight in Schema 2 (i.e., BOX+FISH 954 in FIG. 9B, where weight (BOX+FISH)=Number_of_immediate_links(BOX+FISH)*Number_of_direct_concepts(BOX+FISH)=5*7=35) are included in Table 14 presented below.

TABLE 14

| Cc = Common Concept | A = Distance (Cc, BOX + FISH) | Distance(Cc, Schema2) = 1 + A |
|---|---|---|
| FORM | 1 | 2 |
| MOTION | 1 | 2 |
| TIME | 2 | 3 |
| EFFORT | 2 | 3 |

Step 704 (see FIG. 7) also includes calculating the number of immediate links each common concept has with sub-schema 1450 (see FIG. 14B) (i.e., the sub-schema that is imported in step 308 (see FIG. 3) and that is modified to create schema 1400 (see FIG. 14A) in step 206 (see FIG. 2)). Table 15 presented below includes the number of immediate links each common concept has with sub-schema 1450 (see FIG. 14B).

TABLE 15

| Cc = Common Concept | Number of immediate links in the imported sub-schema |
|---|---|
| FORM | 2 |
| MOTION | 1 |
| TIME | 1 |
| EFFORT | 1 |

Step 708 (see FIG. 7) calculates the strength of the bridge of Schema 2 with sub-schema 1450 (see FIG. 14B) as follows: Strength_of_bridge(Schema2,imported sub-schema)= the summation over all shared concepts [number of immediate links from the imported sub-schema to the shared concept/ distance of the shared concept to Schema 2]. The strength of bridge calculations in step 708 are included in Table 16, which is presented below.

TABLE 16

| Cc = Common Concept | A = Distance(Cc, Schema2) | B = Number of immediate links in the imported sub-schema | B/A | Strength of the bridge |
|---|---|---|---|---|
| FORM | 2 | 2 | 1 | 13/6 = 2.17 |
| MOTION | 2 | 1 | 1/2 | |
| TIME | 3 | 1 | 1/3 | |
| EFFORT | 3 | 1 | 1/3 | |

Step 214 (see FIG. 2) determines the value of Bridge (Schema2, Schema1) as follows: Value_of_Bridge (Schema2, Schema1)=Intrinsic value of schema 1400 (see FIG. 14A)*Strength_of_bridge (Schema2, imported sub-schema)=2.68*2.17=5.81.

Since Value_of_Bridge (Schema1,Schema2)>Value_of_Bridge (Schema2,Schema1) (i.e., 6.43>5.81), this example indicates that Schema 2 (i.e., the fish schema) has more value to Schema 1 (i.e., the car schema) than Schema 1 has to Schema 2.

Computer System

Figure 15:
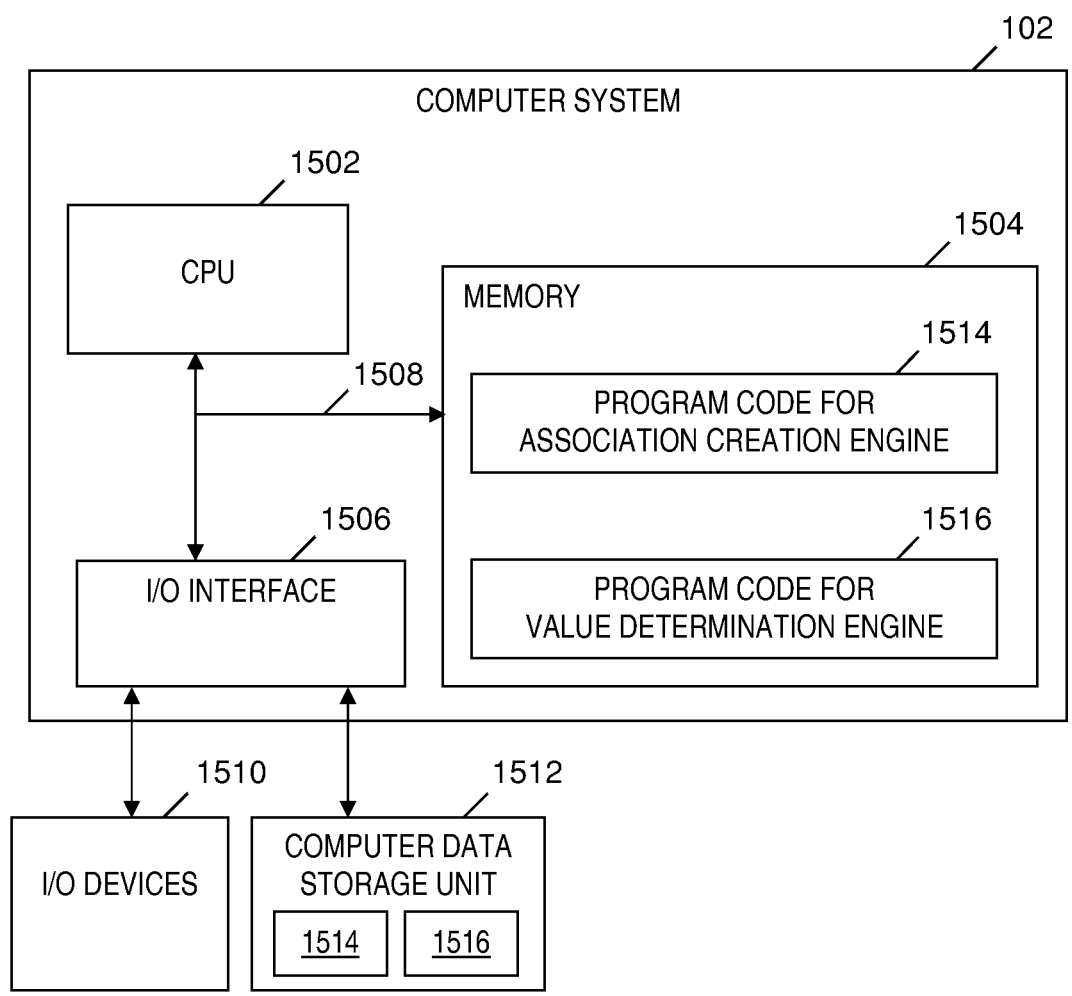
FIG. 15 is a block diagram of a computer system that is included in the system of FIG. 1 and that implements the process of FIG. 2, FIG. 3, FIG. 4, FIG. 5, FIG. 6, FIG. 7 and FIG. 8, in accordance with embodiments of the present invention.

FIG. 15 is a block diagram of a computer system that is included in the system of FIG. 1 and that implements the processes of FIG. 2, FIG. 3, FIG. 4, FIG. 5, FIG. 6, FIG. 7 and FIG. 8, in accordance with embodiments of the present invention. Computer system 102 generally comprises a central processing unit (CPU) 1502, a memory 1504, an input/output (I/O) interface 1506, and a bus 1508. Further, computer system 102 is coupled to I/O devices 1510 and a computer data storage unit 1512. CPU 1502 performs computation and control functions of computer system 102, including carrying out instructions included in program code 1514 and program code 1516 to perform a method of determining a value of an association between ontologies, where the instructions are carried out by CPU 1502 via memory 1504. CPU 1502 may comprise a single processing unit, or be distributed across one or more processing units in one or more locations (e.g., on a client and server). In one embodiment, program code 1514 includes code for association creation engine 112 (see FIG. 1) and program code 1516 includes code for value determination engine 114 (see FIG. 1).

Memory 1504 may comprise any known computer-readable storage medium, which is described below. In one embodiment, cache memory elements of memory 1504 provide temporary storage of at least some program code (e.g., program code 1514 and/or program code 1516) in order to reduce the number of times code must be retrieved from bulk storage while instructions of the program code are carried out. Moreover, similar to CPU 1502, memory 1504 may reside at a single physical location, comprising one or more types of data storage, or be distributed across a plurality of physical systems in various forms. Further, memory 1504 can include data distributed across, for example, a local area network (LAN) or a wide area network (WAN).

I/O interface 1506 comprises any system for exchanging information to or from an external source. I/O devices 1510 comprise any known type of external device, including a display device (e.g., monitor), keyboard, mouse, printer, speakers, handheld device, facsimile, etc. Bus 1508 provides a communication link between each of the components in computer system 102, and may comprise any type of transmission link, including electrical, optical, wireless, etc.

I/O interface 1506 also allows computer system 102 to store information (e.g., data or program instructions such as program code 1514 and program code 1516) on and retrieve the information from computer data storage unit 1512 or another computer data storage unit (not shown). Computer data storage unit 1512 may comprise any known computer-readable storage medium, which is described below. For example, computer data storage unit 1512 may be a non-volatile data storage device, such as a magnetic disk drive (i.e., hard disk drive) or an optical disc drive (e.g., a CD-ROM drive which receives a CD-ROM disk).

Memory 1504 and/or storage unit 1512 may store computer program code 1514 and program code 1516 that includes instructions that are carried out by CPU 1502 via memory 1504 to determine a value of an association between ontologies. Although FIG. 15 depicts memory 1504 as including program code 1514 and program code 1516, the present invention contemplates embodiments in which memory 1504 does not include all of code 1514 and code 1516 simultaneously, but instead at one time includes a portion of code 1514 and/or a portion of code 1516.

Further, memory 1504 may include other systems not shown in FIG. 15, such as an operating system (e.g., Linux®) that runs on CPU 1502 and provides control of various components within and/or connected to computer system 102. Linux is a registered trademark of Linus Torvalds in the United States, other countries, or both.

Storage unit 1512 and/or one or more other computer data storage units (not shown) that are coupled to computer system 102 may store ontologies 110-1 . . . 110-N (see FIG. 1).

As will be appreciated by one skilled in the art, in a first embodiment, the present invention may be a system; in a second embodiment, the present invention may be a method; and in a third embodiment, the present invention may be a computer program product. A component of an embodiment of the present invention may take the form of an entirely hardware-based component, an entirely software component (including firmware, resident software, micro-code, etc.) or a component combining software and hardware sub-components that may all generally be referred to herein as a "module".

An embodiment of the present invention may take the form of a computer program product embodied in one or more computer-readable storage medium(s) (e.g., memory 1504 and/or computer data storage unit 1512) having computer-readable program code (e.g., program code 1514 and program code 1516) embodied or stored thereon.

Any combination of one or more computer-readable mediums (e.g., memory 1504 and computer data storage unit 1512) may be utilized. The computer readable medium may be a computer-readable signal medium or a computer-readable storage medium. In one embodiment, the computer-readable storage medium is a computer-readable storage device or computer-readable storage apparatus. Each of the terms computer-readable storage device and computer-readable storage apparatus does not encompass signal propagation media such as copper cables, optical fibers and wireless transmission media. A computer-readable storage medium may be, for example, but not limited to, an electronic, magnetic, electromagnetic, or semiconductor system, apparatus, device or any suitable combination of the foregoing. A non-exhaustive list of more specific examples of the computer-readable storage medium includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium is a tangible storage device that is not a transitory signal transmission medium and that can contain or store a program (e.g., program code 1514 or program code 1516) for use by or in connection with a system, apparatus, or device for carrying out instructions.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with a system, apparatus, or device for carrying out instructions.

Program code (e.g., program code 1514 and 1516) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 1514 and 1516) for carrying out operations for aspects of the present invention may be written in any combination of one or more programming languages, including an object-oriented programming language such as Java®, Smalltalk, C++ or the like and conventional procedural programming languages, such as the "C" programming language or similar programming languages. Java is a registered trademark of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102 included in FIG. 15. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIGS. 2-8) and/or block diagrams of methods, apparatus (systems) (e.g., FIG. 1 and FIG. 15), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 1514 and 1516). These computer program instructions may be provided to one or more hardware processors (e.g., CPU 1502) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowcharts and/or block diagram block or blocks.

These computer program instructions may also be stored in a computer-readable medium (e.g., memory 1504 or computer data storage unit 1512) that can direct a computer (e.g., computer system 102), other programmable data processing apparatus, or other devices to function in a particular manner, such that the instructions (e.g., program 1514 and program 1516) stored in the computer-readable medium produce an article of manufacture including instructions which implement the function/act specified in the flowcharts and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program 1514 and program 1516) which are carried out on the computer, other programmable apparatus, or other devices provide processes for implementing the functions/acts specified in the flowcharts and/or block diagram block or blocks.

Any of the components of an embodiment of the present invention can be deployed, managed, serviced, etc. by a service provider that offers to deploy or integrate computing infrastructure with respect to determining a value of an association between ontologies. Thus, an embodiment of the present invention discloses a process for supporting computer infrastructure, wherein the process comprises a first computer system providing at least one support service for at least one of integrating, hosting, maintaining and deploying computer-readable code (e.g., program code 1514 and program code 1516) in a second computer system (e.g., computer system 102) comprising one or more processors (e.g., CPU 1502), wherein the processor(s) carry out instructions contained in the code causing the second computer system to determine a value of an association between ontologies.

In another embodiment, the invention provides a method that performs the process steps of the invention on a subscription, advertising and/or fee basis. That is, a service provider, such as a Solution Integrator, can offer to create, maintain, support, etc. a process of determining a value of an association between ontologies. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIGS. 2-8 and the block diagrams in FIG. 1 and FIG. 15 illustrate the architecture, functionality, and operation of possible implementations of systems, methods, and computer program products according to various embodiments of the present invention. In this regard, each block in the flowcharts or block diagrams may represent a module, segment, or portion of code (e.g., program code 1514 and program code 1516), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of determining a value of an association between a first ontology schema and a second ontology schema, the method comprising the steps of:

a computer generating a first bridge of the first ontology schema (S1) with the second ontology schema (S2), wherein the step of generating the first bridge comprises identifying significant concepts included in S2, creating a first sub-schema S based on the identified significant concepts included in S2, and importing the first sub-schema S into S1 which completes a generation of the first bridge of S1 with S2;

the computer extracting the first sub-schema S from the first bridge of S1 with S2;

the computer creating a first schema S' from the first sub-schema S, wherein the step of creating the first schema S' comprises removing first common concepts from the first sub-schema S, removing from the first sub-schema S relationships to the first common concepts, and for each common concept in the first common concepts to which first and second concepts have immediate links in the first sub-schema S, the computer creating a first new immediate link in the first schema S' between the first and second concepts, the first common concepts being concepts that S1 and S2 have in common;

the computer determining an intrinsic value of first schema S';

the computer determining a strength of a bridge of S1 with first sub-schema S;

based on the intrinsic value of first schema S' and the strength of the bridge of S1 with first sub-schema S, the computer determining a first value of the first bridge of S1 with S2;

the computer generating a second bridge of S2 with S1, wherein the step of generating the second bridge comprises identifying significant concepts included in S1, creating a second sub-schema S based on the identified significant concepts included in S1, and importing the second sub-schema S into S2 which completes a generation of the second bridge of S2 with S1;

the computer extracting the second sub-schema S from the second bridge of S2 with S1;

the computer creating a second schema S' from the second sub-schema S, wherein the step of creating the second schema S' comprises removing second common concepts from the second sub-schema S, removing from the second sub-schema S relationships to the second common concepts, and for each common concept in the second common concepts to which third and fourth concepts have immediate links in the second sub-schema S, the computer creating a second new immediate link in the second schema S' between the third and fourth concepts, the second common concepts being concepts that S2 and S1 have in common;

the computer determining an intrinsic value of second schema S';

the computer determining a strength of a bridge of S2 with second sub-schema S;

based on the intrinsic value of second schema S' and the strength of the bridge of S2 with second sub-schema S, the computer determining a second value of the second bridge of S2 with S1, the second value of the second bridge being different from the first value of the first bridge;

the computer determining a sum of the first value of the first bridge and the second value of the second bridge; and based on the sum, the computer determining the value of the association between S1 and S2.

2. The method of claim 1, wherein the step of identifying the significant concepts included in S2 comprises:

the computer determining the concepts that S1 and S2 have in common;

the computer determining a significance threshold;

for each concept Ci included in S2, the computer determining whether Ci is included in the concepts that S1 and S2 have in common or not included in the concepts that S1 and S2 have in common;

for each concept Ci that is determined to be included in the concepts that S1 and S2 have in common, the computer identifying the Ci as being included in the significant concepts included in S2;

for each concept Ci that is determined to be not included in the concepts that S1 and S2 have in common, the computer calculating a respective value of significance(Ci), wherein significance(Ci) is a function providing a significance of the Ci with respect to the concepts that S1 and S2 have in common;

the computer determining whether each value of significance(Ci) is greater than the significance threshold; and for each respective value of significance(Ci) that is greater than the significance threshold, the computer identifying the Ci as being included in the significant concepts included in S2.

3. The method of claim 1, further comprising the step of:

providing at least one support service for at least one of creating, integrating, hosting, maintaining, and deploying computer-readable program code in the computer, the program code being executed by a processor of the computer which implements the steps of generating the first bridge, extracting the first sub-schema S, creating the first schema S', determining the intrinsic value of first schema S', determining the strength of the bridge of S1 with first sub-schema S, determining the first value of the first bridge, generating the second bridge, extracting the second sub-schema S from the second bridge, creating the second schema S', determining the intrinsic value of second schema S', determining the strength of the bridge of S2 with second sub-schema S, determining the second value of the second bridge of S2 with S1, determining the sum, and determining the value of the association between S1 and S2.

4. A computer system comprising:

a central processing unit (CPU);

a memory coupled to the CPU; and a computer-readable, tangible storage device coupled to the CPU, the storage device containing instructions that, when carried out by the CPU via the memory, implement a method of determining a value of an association between a first ontology schema and a second ontology schema, the method comprising the steps of:

the computer system generating a first bridge of the first ontology schema (S1) with the second ontology schema (S2), wherein the step of generating the first bridge comprises identifying significant concepts included in S2, creating a first sub-schema S based on the identified significant concepts included in S2, and importing the first sub-schema S into S1 which completes a generation of the first bridge of S1 with S2;

the computer system extracting the first sub-schema S from the first bridge of S1 with S2;

the computer system creating a first schema S' from the first sub-schema S, wherein the step of creating the first schema S' comprises removing first common concepts from the first sub-schema S, removing from the first sub-schema S relationships to the first common concepts, and for each common concept in the first common concepts to which first and second concepts have immediate links in the first sub-schema S, the computer system creating a first new immediate link in the first schema S' between the first and second concepts, the first common concepts being concepts that S1 and S2 have in common;

the computer system determining an intrinsic value of first schema S';

the computer system determining a strength of a bridge of S1 with first sub-schema S;

based on the intrinsic value of first schema S' and the strength of the bridge of S1 with first sub-schema S, the computer system determining a first value of the first bridge of S1 with S2;

the computer system generating a second bridge of S2 with S1, wherein the step of generating the second bridge comprises identifying significant concepts included in S1, creating a second sub-schema S based on the identified significant concepts included in S1, and importing the second sub-schema S into S2 which completes a generation of the second bridge of S2 with S1;

the computer system extracting the second sub-schema S from the second bridge of S2 with S1;

the computer system creating a second schema S' from the second sub-schema S, wherein the step of creating the second schema S' comprises removing second common concepts from the second sub-schema S, removing from the second sub-schema S relationships to the second common concepts, and for each common concept in the second common concepts to which third and fourth concepts have immediate links in the second sub-schema S, the computer system creating a second new immediate link in the second schema S' between the third and fourth concepts, the second common concepts being concepts that S2 and S1 have in common;

the computer system determining an intrinsic value of second schema S';

the computer system determining a strength of a bridge of S2 with second sub-schema S;

based on the intrinsic value of second schema S' and the strength of the bridge of S2 with second sub-schema S, the computer system determining a second value of the second bridge of S2 with S1, the second value of the second bridge being different from the first value of the first bridge;

the computer system determining a sum of the first value of the first bridge and the second value of the second bridge; and based on the sum, the computer system determining the value of the association between S1 and S2.

5. The computer system of claim 4, wherein the step of identifying the significant concepts included in S2 comprises:

the computer system determining the concepts that S1 and S2 have in common;

the computer system determining a significance threshold;

for each concept $C_i$ included in S2, the computer system determining whether $C_i$ is included in the concepts that S1 and S2 have in common or not included in the concepts that S1 and S2 have in common;

for each concept $C_i$ that is determined to be included in the concepts that S1 and S2 have in common, the computer system identifying the $C_i$ as being included in the significant concepts included in S2;

for each concept $C_i$ that is determined to be not included in the concepts that S1 and S2 have in common, the computer system calculating a respective value of significance($C_i$), wherein significance($C_i$) is a function providing a significance of $C_i$ with respect to the concepts that S1 and S2 have in common;

the computer system determining whether each value of significance($C_i$) is greater than the significance threshold; and for each respective value of significance($C_i$) that is greater than the significance threshold, the computer system identifying the $C_i$ as being included in the significant concepts included in S2.

6. A computer program product comprising:

a computer-readable, tangible storage device; and computer-readable program instructions stored in the computer-readable, tangible storage device, the computer-readable program instructions, when carried out by a central processing unit (CPU) of a computer system, implement a method of determining a value of an association between a first ontology schema and a second ontology schema, the method comprising the steps of:

the computer system generating a first bridge of the first ontology schema (S1) with the second ontology schema (S2), wherein the step of generating the first bridge comprises identifying significant concepts included in S2, creating a first sub-schema S based on the identified significant concepts included in S2, and importing the first sub-schema S into S1 which completes a generation of the first bridge of S1 with S2;

the computer system extracting the first sub-schema S from the first bridge of S1 with S2;

the computer system creating a first schema S' from the first sub-schema S, wherein the step of creating the first schema S' comprises removing first common concepts from the first sub-schema S, removing from the first sub-schema S relationships to the first common concepts, and for each common concept in the first common concepts to which first and second concepts have immediate links in the first sub-schema S, the computer system creating a first new immediate link in the first schema S' between the first and second concepts, the first common concepts being concepts that S1 and S2 have in common;

the computer system determining an intrinsic value of first schema S';

the computer system determining a strength of a bridge of S1 with first sub-schema S;

based on the intrinsic value of first schema S' and the strength of the bridge of S1 with first sub-schema S, the computer system determining a first value of the first bridge of S1 with S2;

the computer system generating a second bridge of S2 with S1, wherein the step of generating the second bridge comprises identifying significant concepts included in S1, creating a second sub-schema S based on the identified significant concepts included in S1, and importing the second sub-schema S into S2 which completes a generation of the second bridge of S2 with S1;

the computer system extracting the second sub-schema S from the second bridge of S2 with S1;

the computer system creating a second schema S' from the second sub-schema S, wherein the step of creating the second schema S' comprises removing second common concepts from the second sub-schema S, removing from the second sub-schema S relationships to the second common concepts, and for each common concept in the second common concepts to which third and fourth concepts have immediate links in the second sub-schema S, the computer system creating a second new immediate link in the second schema S' between the third and fourth concepts, the second common concepts being concepts that S2 and S1 have in common;

the computer system determining an intrinsic value of second schema S';

the computer system determining a strength of a bridge of S2 with second sub-schema S;

based on the intrinsic value of second schema S' and the strength of the bridge of S2 with second sub-schema S, the computer system determining a second value of the second bridge of S2 with S1, the second value of the second bridge being different from the first value of the first bridge;

the computer system determining a sum of the first value of the first bridge and the second value of the second bridge; and based on the sum, the computer system determining the value of the association between S1 and S2.

7. The program product of claim 6, wherein the step of identifying the significant concepts included in S2 comprises:

the computer system determining the concepts that S1 and S2 have in common;

the computer system determining a significance threshold;

for each concept Ci included in S2, the computer system determining whether Ci is included in the concepts that S1 and S2 have in common or not included in the concepts that S1 and S2 have in common;

for each concept Ci that is determined to be included in the concepts that S1 and S2 have in common, the computer system identifying the Ci as being included in the significant concepts included in S2;

for each concept Ci that is determined to be not included in the concepts that S1 and S2 have in common, the computer system calculating a respective value of significance(Ci), wherein significance(Ci) is a function providing a significance of Ci with respect to the concepts that S1 and S2 have in common;

the computer system determining whether each value of significance(Ci) is greater than the significance threshold; and for each respective value of significance(Ci) that is greater than the significance threshold, the computer system identifying the Ci as being included in the significant concepts included in S2.

* * * * *